(12) United States Patent
Feller et al.

(10) Patent No.: US 11,685,117 B2
(45) Date of Patent: Jun. 27, 2023

(54) THREE-DIMENSIONAL PRINTING METHODS FOR REDUCING BUBBLES BY DE-GASSING THROUGH BUILD PLATE

(71) Applicant: Carbon, Inc., Redwood City, CA (US)

(72) Inventors: Bob E. Feller, San Mateo, CA (US); David Moore, San Carlos, CA (US); John R. Tumbleston, Menlo Park, CA (US); Ronald Truong, San Mateo, CA (US); Kyle Laaker, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 321 days.

(21) Appl. No.: 17/039,163

(22) Filed: Sep. 30, 2020

(65) Prior Publication Data

US 2021/0023783 A1 Jan. 28, 2021

Related U.S. Application Data

(63) Continuation of application No. 16/081,544, filed as application No. PCT/US2017/040376 on Jun. 30, 2017, now Pat. No. 10,821,667.

(Continued)

(51) Int. Cl.
*B33Y 50/02* (2015.01)
*B29C 64/245* (2017.01)
(Continued)

(52) U.S. Cl.
CPC ........ *B29C 64/245* (2017.08); *B29C 33/0083* (2013.01); *B29C 37/006* (2013.01);
(Continued)

(58) Field of Classification Search
CPC ........ B29C 2033/0005; B29C 33/0083; B29C 64/245; B29C 64/264; B29C 64/268;
(Continued)

(56) References Cited

U.S. PATENT DOCUMENTS

| 4,337,130 A | 6/1982 | Ahramjian |
| RE31,406 E | 10/1983 | Gaylord |

(Continued)

FOREIGN PATENT DOCUMENTS

| CN | 102715751 A | 10/2012 |
| JP | 2012210408 A | 11/2012 |

(Continued)

OTHER PUBLICATIONS

"International Search Report and Written Opinion for PCT/US2017/040376 dated Sep. 8, 2017, 14 pages."

(Continued)

*Primary Examiner* — Leo B Tentoni
(74) *Attorney, Agent, or Firm* — Myers Bigel, P.A.

(57) ABSTRACT

A method of forming a three-dimensional object includes providing a carrier and an optically transparent member having a build surface. The carrier and the build surface define a build region therebetween. The method further includes filling said build region with a polymerizable liquid; continuously or intermittently irradiating said build region with light through said optically transparent member to form a solid polymer from said polymerizable liquid; applying a reduced pressure and/or polymer inhibitor-enriched gas to the polymerizable liquid through the optically transparent member to thereby reduce a gas content of the polymerizable liquid; and continuously or intermittently advancing (e.g., sequentially or concurrently with said irradiating step) said carrier away from said build surface to form said three-dimensional object from said solid polymer.

24 Claims, 7 Drawing Sheets

Related U.S. Application Data

(60) Provisional application No. 62/357,659, filed on Jul. 1, 2016, provisional application No. 62/357,646, filed on Jul. 1, 2016.

(51) Int. Cl.

| | |
|---|---|
| *B33Y 10/00* | (2015.01) |
| *B33Y 30/00* | (2015.01) |
| *B29C 64/129* | (2017.01) |
| *B29C 64/124* | (2017.01) |
| *B29C 37/00* | (2006.01) |
| *B29C 64/364* | (2017.01) |
| *B29C 64/371* | (2017.01) |
| *B29C 33/00* | (2006.01) |
| *B29C 64/264* | (2017.01) |
| *B29C 64/268* | (2017.01) |
| *B33Y 70/00* | (2020.01) |
| *B29C 64/176* | (2017.01) |
| *B29C 64/277* | (2017.01) |
| *B29C 64/393* | (2017.01) |

(52) U.S. Cl.
CPC .......... *B29C 64/124* (2017.08); *B29C 64/129* (2017.08); *B29C 64/176* (2017.08); *B29C 64/264* (2017.08); *B29C 64/268* (2017.08); *B29C 64/277* (2017.08); *B29C 64/364* (2017.08); *B29C 64/371* (2017.08); *B33Y 10/00* (2014.12); *B33Y 30/00* (2014.12); *B33Y 70/00* (2014.12); *B29C 64/393* (2017.08); *B29C 2033/0005* (2013.01); *B29C 2791/006* (2013.01); *B29C 2791/008* (2013.01); *B29C 2791/009* (2013.01); *B29K 2995/006* (2013.01); *B29K 2995/0026* (2013.01)

(58) Field of Classification Search
CPC ... B29C 64/277; B29C 64/386; B29C 64/393; B29C 2791/006; B29C 2791/009; B29K 2995/0026; B33Y 30/00; B33Y 50/00; B33Y 50/02
USPC ...................................... 425/135, 174.4, 470
See application file for complete search history.

(56) References Cited

U.S. PATENT DOCUMENTS

| | | | |
|---|---|---|---|
| 4,845,089 A | 7/1989 | Lindig et al. | |
| 4,923,906 A | 5/1990 | Mueller et al. | |
| 5,017,461 A | 5/1991 | Abe | |
| 5,051,115 A | 9/1991 | Leitgeb et al. | |
| 5,070,170 A | 12/1991 | Robertson et al. | |
| 5,141,665 A | 8/1992 | Sherman | |
| 5,162,469 A | 11/1992 | Chen | |
| 5,236,637 A | 8/1993 | Hull | |
| 5,308,685 A | 5/1994 | Froggatt | |
| 5,310,571 A | 5/1994 | Meadows | |
| 5,349,394 A | 9/1994 | Freeman et al. | |
| 5,374,500 A | 12/1994 | Carpenter et al. | |
| 5,691,541 A | 11/1997 | Ceglio et al. | |
| 5,836,313 A | 11/1998 | Perez et al. | |
| 6,238,852 B1 | 5/2001 | Klosner | |
| 6,248,509 B1 | 6/2001 | Sanford | |
| 6,312,134 B1 | 11/2001 | Jain et al. | |
| 6,602,975 B2 | 8/2003 | Hubbell et al. | |
| 6,692,891 B2 | 2/2004 | Jung et al. | |
| 6,932,930 B2 | 8/2005 | Desimone et al. | |
| 6,939,940 B2 | 9/2005 | Dingemans et al. | |
| 7,097,302 B2 | 8/2006 | McGregor | |
| 7,344,731 B2 | 3/2008 | Lai et al. | |
| 7,435,495 B2 | 10/2008 | Desimone et al. | |
| 7,438,846 B2 | 10/2008 | John | |
| 7,507,784 B2 | 3/2009 | Dingemans et al. | |
| 7,534,844 B2 | 5/2009 | Lee et al. | |
| 7,550,246 B2 | 6/2009 | Fukuzumi et al. | |
| 7,556,490 B2 | 7/2009 | Wicker et al. | |
| 7,649,029 B2 | 1/2010 | Kolb et al. | |
| 7,651,682 B2 | 1/2010 | Devore et al. | |
| 7,651,683 B2 | 1/2010 | Devore et al. | |
| 7,767,728 B2 | 8/2010 | Lu et al. | |
| 7,824,839 B2 | 11/2010 | Ober et al. | |
| 7,862,176 B2 | 1/2011 | Gemoules et al. | |
| 7,892,474 B2 | 2/2011 | Shkolnik et al. | |
| 7,902,526 B2 | 3/2011 | Kim et al. | |
| 7,919,162 B2 | 4/2011 | Desimone et al. | |
| 7,935,476 B2 | 5/2011 | Teng | |
| 8,110,135 B2 | 2/2012 | El-siblani | |
| 8,119,214 B2 | 2/2012 | Schwantes et al. | |
| 8,158,728 B2 | 4/2012 | Desimone et al. | |
| 8,232,043 B2 | 7/2012 | Williamson et al. | |
| 8,263,129 B2 | 9/2012 | Desimone et al. | |
| 8,268,446 B2 | 9/2012 | Desimone et al. | |
| 8,535,779 B1 | 9/2013 | Varanasi et al. | |
| 8,574,704 B2 | 11/2013 | Smith et al. | |
| 9,453,142 B2 | 9/2016 | Rolland et al. | |
| 11,299,579 B2 | 4/2022 | Rolland et al. | |
| 11,312,084 B2 | 4/2022 | Rolland et al. | |
| 11,358,342 B2 | 6/2022 | Rolland et al. | |
| 2013/0292862 A1 | 11/2013 | Joyce | |
| 2013/0295212 A1 | 11/2013 | Chen et al. | |
| 2014/0290478 A1 | 10/2014 | Liu et al. | |
| 2016/0059487 A1* | 3/2016 | DeSimone | B29C 64/393 425/162 |
| 2016/0160077 A1 | 6/2016 | Rolland et al. | |
| 2016/0303795 A1* | 10/2016 | Liu | B29C 64/364 |
| 2018/0036941 A1* | 2/2018 | Xu | B29C 64/264 |

FOREIGN PATENT DOCUMENTS

| | | | |
|---|---|---|---|
| WO | 2012129968 A1 | 10/2012 | |
| WO | 20150142546 | 9/2015 | |
| WO | 2015200173 A1 | 12/2015 | |
| WO | 2015200179 A1 | 12/2015 | |
| WO | 2015200189 A1 | 12/2015 | |
| WO | WO-2016173100 A1 * | 3/2016 | ........... B29C 64/245 |
| WO | 20170053783 | 3/2017 | |

OTHER PUBLICATIONS

BASF the Chemical Company, "Photoacid Generator Selection Guide for the Electronics Industry and Energy Curable Coatings", Product Selection Guide, 2010, (3 pages).

Pan, et al., "A Fast Mask Projection Stereolithography Process for Fabricating Digital Models in Minutes", J. Manufacturing Sci. and Eng. 134(5), 2012, 051011-1-9.

Tumbleston, et al., "Continuous liquid interface production of 3D Objects", Science, 347(6228), 2015, 1349-1352.

\* cited by examiner

THREE-DIMENSIONAL PRINTING METHODS FOR REDUCING BUBBLES BY DE-GASSING THROUGH BUILD PLATE

RELATED APPLICATIONS

This application is a continuation of and claims priority to U.S. application Ser. No. 16/081,544, filed Aug. 31, 2018, which is a 35 U.S.C. § 371 national phase entry of International Application No. PCT/US2017/040376, filed Jun. 30, 2017, which claims priority to U.S. Provisional Application Ser. Nos. 62/357,646 and 62/357,659, filed Jul. 1, 2016, the disclosures of which are incorporated by reference herein in their entireties.

FIELD OF THE INVENTION

The present invention concerns methods and apparatus for the fabrication of solid three-dimensional objects from liquid materials.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4. While such "bottom up" techniques hold the potential to eliminate the need for a deep well in which the object is submerged by instead lifting the object out of a relatively shallow well or pool, a problem with such "bottom up" fabrication techniques, as commercially implemented, is that extreme care must be taken, and additional mechanical elements employed, when separating the solidified layer from the bottom plate due to physical and chemical interactions therebetween. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, S. Dak., USA, employ a sliding build plate. See, e.g., M. Joyce, US Patent App. 2013/0292862 and Y. Chen et al., US Patent App. 2013/0295212 (both Nov. 7, 2013); see also Y. Pan et al., *J. Manufacturing Sci. and Eng.* 134, 051011-1 (October 2012). Such approaches introduce a mechanical step that may complicate the apparatus, slow the method, and/or potentially distort the end product.

Continuous processes for producing a three-dimensional object are suggested at some length with respect to "top down" techniques in U.S. Pat. No. 7,892,474, but this reference does not explain how they may be implemented in "bottom up" systems in a manner non-destructive to the article being produced. Accordingly, there is a need for alternate methods and apparatus for three-dimensional fabrication that can obviate the need for mechanical separation steps in "bottom-up" fabrication.

SUMMARY OF THE INVENTION

Described herein are methods, systems and apparatus (including associated control methods, systems and apparatus), for the production of a three-dimensional object by additive manufacturing. In preferred (but not necessarily limiting) embodiments, the method is carried out continuously. In preferred (but not necessarily limiting) embodiments, the three-dimensional object is produced from a liquid interface. Hence they are sometimes referred to, for convenience and not for purposes of limitation, as "continuous liquid interphase printing" or "continuous liquid interface production" ("CLIP") herein (the two being used interchangeably). See, e.g., J. Tumbleston et al., *Continuous liquid interface production of 3D objects*, Science 347, 1349-1352 (published online Mar. 16, 2015). A schematic representation of one embodiment thereof is given in FIG. 1 herein. In some embodiments of the methods and compositions described above and below, the polymerizable liquid has a viscosity of 500 or 1,000 centipoise or more at room temperature and/or under the operating conditions of the method, up to a viscosity of 10,000, 20,000, or 50,000 centipoise or more, at room temperature and/or under the operating conditions of the method.

In some embodiments, a method of forming a three-dimensional object includes: providing a carrier and an optically transparent member having a build surface, said carrier and said build surface defining a build region therebetween; filling said build region with a polymerizable liquid; continuously or intermittently irradiating said build region with light through said optically transparent member to form a solid polymer from said polymerizable liquid; applying a reduced pressure and/or polymer inhibitor-enriched gas to the polymerizable liquid through the optically transparent member to thereby reduce a gas content of the polymerizable liquid; and continuously or intermittently advancing (e.g., sequentially or concurrently with said irradiating step) said carrier away from said build surface to form said three-dimensional object from said solid polymer.

In some embodiments, applying a reduced pressure and/or polymer inhibitor-enriched gas to the polymerizable liquid through the optically transparent member to thereby reduce a gas content of the polymerizable liquid comprises supplying a polymerization inhibitor gas to the polymerizable liquid through the optically transparent member.

In some embodiments, supplying a polymerization inhibitor gas to the polymerization liquid comprises supplying the polymerization inhibitor gas at a substantially constant pressure.

In some embodiments, supplying a polymerization inhibitor gas to the polymerization liquid comprises supplying an oxygen-enriched gas at a pressure less than atmospheric pressure.

In some embodiments, the oxygen-enriched gas is about 80%-100% oxygen.

In some embodiments, the pressure of the oxygen-enriched gas is substantial equal to a partial pressure of oxygen in air at atmospheric pressure.

In some embodiments, the step of applying a reduced pressure and/or polymer inhibitor-enriched gas comprises intermittently applying a reduced pressure.

In some embodiments, the polymerizable liquid comprises a lower region on the optically transparent member, and an upper region on the lower region opposite the optically transparent member, and the step of applying a reduced pressure and/or polymer inhibitor-enriched gas to the polymerizable liquid through the optically transparent member comprises reducing a gas concentration in the upper region.

In some embodiments, a thickness of the lower region is about 1 to 1000 microns.

In some embodiments, the step of intermittently applying a reduced pressure to the polymerizable liquid through the optically transparent member is sufficient to reduce a gas concentration in the upper region and maintain a gas concentration in the lower region.

In some embodiments, the optically transparent member comprises a build plate comprising a channel layer configured to connect to a gas and/or pressure controller.

In some embodiments, filling, irradiating, and/or advancing steps are carried out while also concurrently: (i) continuously maintaining a dead zone of polymerizable liquid in contact with said build surface, and (ii) continuously maintaining a gradient of polymerization zone between said dead zone and said solid polymer and in contact with each thereof, said gradient of polymerization zone comprising said polymerizable liquid in partially cured form.

In some embodiments, intermittently applying a reduced pressure to the polymerizable liquid through the optically transparent member to thereby reduce a gas content of the polymerizable liquid is sufficient to maintain a dead zone of less than 1000 microns by reducing a gas concentration in the polymerizable liquid.

In some embodiments, a carrier with said polymerized region adhered thereto is unidirectionally advanced away from the build surface on a stationary build plate.

In some embodiments, the filling step further comprising vertically reciprocating said carrier with respect to said build surface to enhance or speed the refilling of said build region with said polymerizable liquid.

In some embodiments, reducing or holding stationary advancement of the carrier when a reduced pressure is applied to the polymerizable liquid through the optically transparent member.

In some embodiments, an apparatus for forming a three-dimensional object from a polymerizable liquid includes: (a) a support; (b) a carrier operatively associated with said support on which carrier said three-dimensional object is formed; (c) a gas permeable optically transparent member having a build surface, with said build surface and said carrier defining a build region therebetween; (d) a liquid polymer supply (e.g., a well) operatively associated with said build surface and configured to supply liquid polymer into said build region for solidification or polymerization; (e) a radiation source configured to irradiate said build region through said optically transparent member to form a solid polymer from said polymerizable liquid; (f) optionally at least one drive operatively associated with either said transparent member or said carrier; (g) a controller operatively associated with said carrier, and/or optionally said at least one drive, and said radiation source for advancing said carrier away from said build surface to form said three-dimensional object from said solid polymer, (h) a gas/pressure controller in fluid communication with said optically transparent member configured to control a pressure and/or supply a gas to said build surface through said gas permeable member, wherein said gas/pressure controller is configured to carry out the method described above.

In some preferred embodiments of CLIP, the filling, irradiating, and/or advancing steps are carried out while also concurrently: (i) continuously maintaining a dead zone (or persistent liquid interface) of polymerizable liquid in contact with said build surface, and (ii) continuously maintaining a gradient of polymerization zone (which, as discussed below, may also be described as an active surface on the bottom of the growing three dimensional object) between said dead zone and said solid polymer and in contact with each thereof, said gradient of polymerization zone comprising said polymerizable liquid in partially cured form. Stated differently, in some preferred embodiments of CLIP, the three dimensional object, or at least some contiguous portion thereof, is formed or produced in situ. "In situ" as used herein has its meaning in the field of chemical engineering, and means "in place." For example, where both the growing portion of the three-dimensional object and the build surface (typically with their intervening active surface or gradient of polymerization, and dead zone) are maintained in place during formation of at least a portion of the 3D object, or sufficiently in place to avoid the formation of fault lines or planes in the 3D object. For example, in some embodiments according to the invention, different portions of the 3D object, which are contiguous with one another in the final 3D object, can both be formed sequentially from or within a gradient of polymerization or active surface. Furthermore, a first portion of the 3D object can remain in the gradient of polymerization or contacting the active surface while a second portion, that is contiguous with the first portion, is formed in the gradient of polymerization. Accordingly, the 3D object can be remotely fabricated, grown or produced continuously from the gradient of polymerization or active surface (rather than fabricated in discrete layers). The dead zone and gradient of polymerization zone/active surface may be maintained through some or all of the formation of the object being made, for example (and in some embodiments) for a time of at least 5, 10, 20, or 30 seconds, and in some embodiments for a time of at least 1 or 2 minutes.

Non-limiting examples and specific embodiments of the present invention are explained in greater detail in the drawings herein and the specification set forth below. The disclosure of all United States Patent references cited herein are to be incorporated herein by reference in their entirety.

DETAILED DESCRIPTION OF ILLUSTRATIVE EMBODIMENTS

Figure 1:
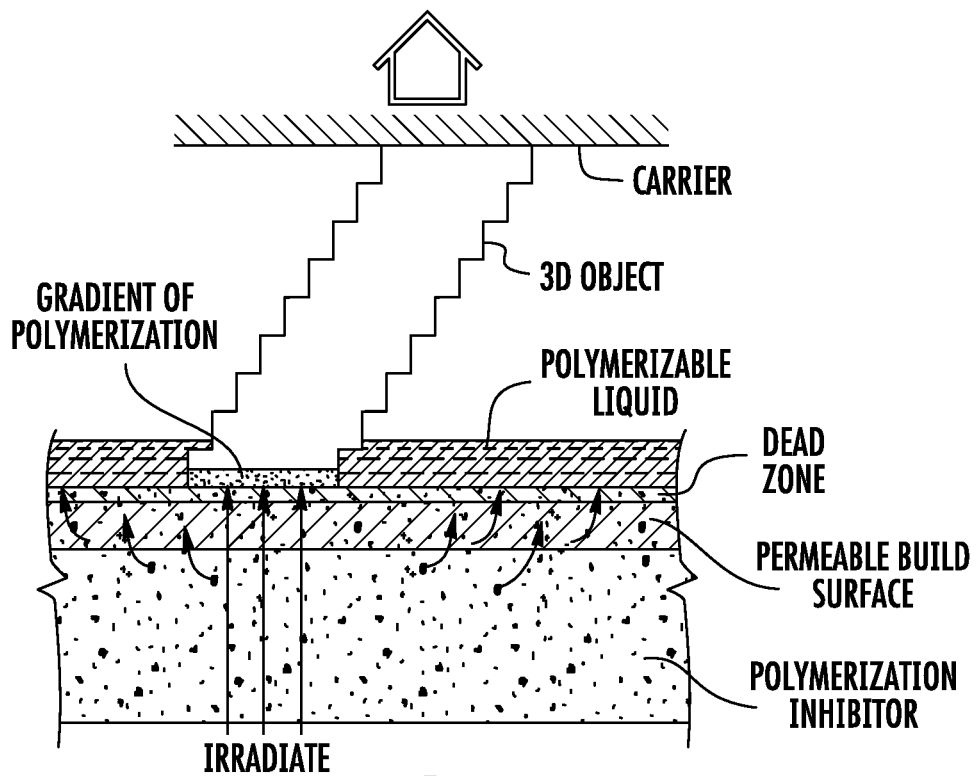
FIG. 1 is a schematic illustration of one embodiment of a method of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids/Part A Components.

Any suitable polymerizable liquid can be used to enable the present invention. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid Catalyzed Polymerizable Liquids.

While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also Photoacid Generator Selection Guide for the electronics industry and energy curable coatings (BASF 2010).

Hydrogels.

In some embodiments suitable resins includes photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable Silicone Resins.

A suitable resin includes photocurable silicones. UV cure silicone rubber, such as Silopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable Resins.

Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable Polyurethanes.

A particularly useful resin is photocurable polyurethanes. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High Performance Resins.

In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluorenone initiators (including derivatives thereof), to initiate cross-linking on irradiation, as discussed further below.

Additional Example Resins.

Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. A particulary useful resin for investment casting applications includes EnvisionTEC's Easy Cast EC500. Additional resin ingredients. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent or detectable compound as described below, though these may also be provided dissolved solubilized in the liquid resin as also discussed below. For example, magnetic or paramagnetic particles or nanoparticles can be employed. The resin or polymerizable material may contain a dispersing agent, such as an ionic surfactant, a non-ionic surfactant, a block copolymer, or the like.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Inhibitors of Polymerization.

Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable Liquids Carrying Live Cells.

In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

2. Apparatus.

Figure 2:
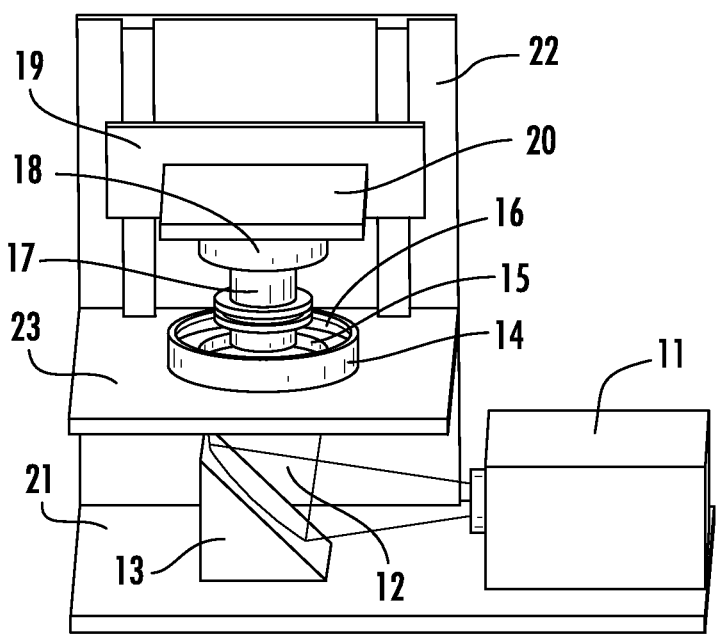
FIG. 2 is a perspective view of one embodiment of an apparatus of the present invention.

A non-limiting embodiment of an apparatus of the invention is shown in FIG. 2. It comprises a radiation source 11 such as a digital light processor (DLP) providing electromagnetic radiation 12 which though reflective mirror 13 illuminates a build chamber defined by wall 14 and a rigid build plate 15 forming the bottom of the build chamber, which build chamber is filled with liquid resin 16. The bottom of the chamber 15 is constructed of build plate comprising a semipermeable member as discussed further below. The top of the object under construction 17 is attached to a carrier 18. The carrier is driven in the vertical direction by linear stage 19, although alternate structures can be used as discussed below.

A liquid resin reservoir, tubing, pumps liquid level sensors and/or valves can be included to replenish the pool of liquid resin in the build chamber (not shown for clarity) though in some embodiments a simple gravity feed may be employed. Drives/actuators for the carrier or linear stage, along with associated wiring, can be included in accordance with known techniques (again not shown for clarity). The drives/actuators, radiation source, and in some embodiments pumps and liquid level sensors can all be operatively associated with a suitable controller, again in accordance with known techniques.

Build plates 15 used to carry out the present invention generally comprise or consist of a (typically rigid or solid, stationary, and/or fixed) semipermeable (or gas permeable) member, alone or in combination with one or more additional supporting substrates (e.g., clamps and tensioning members to rigidify an otherwise flexible semipermeable material). The semipermeable member can be made of any suitable material that is optically transparent at the relevant wavelengths (or otherwise transparent to the radiation source, whether or not it is visually transparent as perceived by the human eye—i.e., an optically transparent window may in some embodiments be visually opaque), including but not limited to porous or microporous glass, and the rigid gas permeable polymers used for the manufacture of rigid gas permeable contact lenses. See, e.g., Norman G. Gaylord, U.S. Pat. No. RE31,406; see also U.S. Pat. Nos. 7,862,176; 7,344,731; 7,097,302; 5,349,394; 5,310,571; 5,162,469; 5,141,665; 5,070,170; 4,923,906; and 4,845,089. In some embodiments such materials are characterized as glassy and/or amorphous polymers and/or substantially crosslinked that they are essentially non-swellable. Preferably the semipermeable member is formed of a material that does not swell when contacted to the liquid resin or material to be polymerized (i.e., is "non-swellable"). Suitable materials for the semipermeable member include amorphous fluoropolymers, such as those described in U.S. Pat. Nos. 5,308,685 and 5,051,115. For example, such fluoropolymers are particularly useful over silicones that would potentially swell when used in conjunction with organic liquid resin inks to be polymerized. For some liquid resin inks, such as more aqueous-based monomeric systems and/or some polymeric resin ink systems that have low swelling tendencies, silicone based window materials maybe suitable. The solubility or permeability of organic liquid resin inks can be dramatically decreased by a number of known parameters including increasing the crosslink density of the window material or increasing the molecular weight of the liquid resin ink. In some embodiments the build plate may be formed from a thin film or sheet of material which is flexible when separated from the apparatus of the invention, but which is clamped and tensioned when installed in the apparatus (e.g., with a tensioning ring) so that it is rendered fixed or rigid in the apparatus. Particular materials include TEFLON AF® fluoropolymers, commercially available from DuPont. Additional materials include perfluoropolyether polymers such as described in U.S. Pat. Nos. 8,268,446; 8,263,129; 8,158,728; and 7,435,495.

It will be appreciated that essentially all solid materials, and most of those described above, have some inherent "flex" even though they may be considered "rigid," depending on factors such as the shape and thickness thereof and environmental factors such as the pressure and temperature to which they are subjected. In addition, the terms "stationary" or "fixed" with respect to the build plate is intended to mean that no mechanical interruption of the process occurs, or no mechanism or structure for mechanical interruption of the process (as in a layer-by-layer method or apparatus) is provided, even if a mechanism for incremental adjustment of the build plate (for example, adjustment that does not lead to or cause collapse of the gradient of polymerization zone) is provided), or if the build surface contributes to reciprocation to aid feeding of the polymerizable liquid, as described further below.

The semipermeable member typically comprises a top surface portion, a bottom surface portion, and an edge surface portion. The build surface is on the top surface portion; and the feed surface may be on one, two, or all three of the top surface portion, the bottom surface portion, and/or the edge surface portion. In the embodiment illustrated in FIG. 2 the feed surface is on the bottom surface portion, but alternate configurations where the feed surface is provided on an edge, and/or on the top surface portion (close to but separate or spaced away from the build surface) can be implemented with routine skill.

The semipermeable member has, in some embodiments, a thickness of from 0.01, 0.1 or 1 millimeters to 10 or 100 millimeters, or more (depending upon the size of the item being fabricated, whether or not it is laminated to or in contact with an additional supporting plate such as glass, etc., as discussed further below.

The permeability of the semipermeable member to the polymerization inhibitor will depend upon conditions such as the pressure of the atmosphere and/or inhibitor, the choice of inhibitor, the rate or speed of fabrication, etc. In general, when the inhibitor is oxygen, the permeability of the semipermeable member to oxygen may be from 10 or 20 Barrers, up to 1000 or 2000 Barrers, or more. For example, a semipermeable member with a permeability of 10 Barrers used with a pure oxygen, or highly enriched oxygen, atmosphere under a pressure of 150 PSI may perform substantially the same as a semipermeable member with a permeability of 500 Barrers when the oxygen is supplied from the ambient atmosphere under atmospheric conditions.

Thus, the semipermeable member may comprise a flexible polymer film (having any suitable thickness, e.g., from 0.001, 0.01, 0.05, 0.1 or 1 millimeters to 1, 5, 10, or 100 millimeters, or more), and the build plate may further comprise a tensioning member (e.g., a peripheral clamp and an operatively associated strain member or stretching member, as in a "drum head"; a plurality of peripheral clamps, etc., including combinations thereof) connected to the polymer film and to fix and rigidify the film (e.g., at least sufficiently so that the film does not stick to the object as the object is advanced and resiliently or elastically rebound therefrom). The film has a top surface and a bottom surface, with the build surface on the top surface and the feed surface preferably on the bottom surface. In other embodiments, the semipermeable member comprises: (i) a polymer film layer (having any suitable thickness, e.g., from 0.001, 0.01, 0.1 or 1 millimeters to 5, 10 or 100 millimeters, or more), having a top surface positioned for contacting said polymerizable liquid and a bottom surface, and (ii) a rigid, gas permeable, optically transparent supporting member (having any suitable thickness, e.g., from 0.01, 0.1 or 1 millimeters to 10, 100, or 200 millimeters, or more), contacting said film layer bottom surface. The supporting member has a top surface contacting the film layer bottom surface, and the supporting member has a bottom surface which may serve as the feed surface for the polymerization inhibitor. Any suitable materials that are semipermeable (that is, permeable to the polymerization inhibitor) may be used. For example, the polymer film or polymer film layer may, for example, be a fluoropolymer film, such as an amorphous thermoplastic fluoropolymer like TEFLON AF1600™ or TEFLON AF2400™ fluoropolymer films, or perfluoropolyether (PFPE), particularly a crosslinked PFPE film, or a crosslinked silicone polymer film. The supporting member comprises a silicone or crosslinked silicone polymer member such as a polydmiethylxiloxane member, a rigid gas permeable polymer member, or a porous or microporous glass member. Films can be laminated or clamped directly to the rigid supporting member without adhesive (e.g., using PFPE and PDMS materials), or silane coupling agents that react with the upper surface of a PDMS layer can be utilized to adhere to the first polymer film layer. UV-curable, acrylate-functional silicones can also be used as a tie layer between UV-curable PFPEs and rigid PDMS supporting layers.

When configured for placement in the apparatus, the carrier defines a "build region" on the build surface, within the total area of the build surface. Because lateral "throw" (e.g., in the X and/or Y directions) is not required in the present invention to break adhesion between successive layers, as in the Joyce and Chen devices noted previously, the area of the build region within the build surface may be maximized (or conversely, the area of the build surface not devoted to the build region may be minimized). Hence in some embodiments, the total surface area of the build region can occupy at least fifty, sixty, seventy, eighty, or ninety percent of the total surface area of the build surface.

As shown in FIG. 2, the various components are mounted on a support or frame assembly 20. While the particular design of the support or frame assembly is not critical and can assume numerous configurations, in the illustrated embodiment it is comprised of a base 21 to which the radiation source 11 is securely or rigidly attached, a vertical member 22 to which the linear stage is operatively associated, and a horizontal table 23 to which wall 14 is removably or securely attached (or on which the wall is placed), and with the build plate rigidly fixed, either permanently or removably, to form the build chamber as described above.

As noted above, the build plate can consist of a single unitary and integral piece of a rigid semipermeable member, or can comprise additional materials. For example, a porous or microporous glass can be laminated or fixed to a rigid semipermeable material. Or, a semipermeable member as an upper portion can be fixed to a transparent lower member having purging channels formed therein for feeding gas carrying the polymerization inhibitor to the semipermeable member (through which it passes to the build surface to facilitate the formation of a release layer of unpolymerized liquid material, as noted above and below). Such purge channels may extend fully or partially through the base plate: For example, the purge channels may extend partially into the base plate, but then end in the region directly underlying the build surface to avoid introduction of distortion. Specific geometries will depend upon whether the feed surface for the inhibitor into the semipermeable member is located on the same side or opposite side as the build surface, on an edge portion thereof, or a combination of several thereof.

Any suitable radiation source (or combination of sources) can be used, depending upon the particular resin employed, including electron beam and ionizing radiation sources. In a preferred embodiment the radiation source is an actinic radiation source, such as one or more light sources, and in particular one or more ultraviolet light sources. Any suitable light source can be used, such as incandescent lights, fluorescent lights, phosphorescent or luminescent lights, a laser, light-emitting diode, etc., including arrays thereof. The light source preferably includes a pattern-forming element operatively associated with a controller, as noted above. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526. Preferably the light source comprises a spatial light modulation array such as a liquid crystal light valve array or micromirror array or DMD (e.g., with an operatively associated digital light processor, typically in turn under the control of a suitable controller), configured to carry out exposure or irradiation of the polymerizable liquid without a mask, e.g., by maskless photolithography. See, e.g., U.S. Pat. Nos. 6,312,134; 6,248,509; 6,238,852; and 5,691,541.

In some embodiments, as discussed further below, there may be movement in the X and/or Y directions concurrently with movement in the Z direction, with the movement in the X and/or Y direction hence occurring during polymerization of the polymerizable liquid (this is in contrast to the movement described in Y. Chen et al., or M. Joyce, supra, which is movement between prior and subsequent polymerization steps for the purpose of replenishing polymerizable liquid). In the present invention such movement may be carried out for purposes such as reducing "burn in" or fouling in a particular zone of the build surface.

Because an advantage of some embodiments of the present invention is that the size of the build surface on the semipermeable member (i.e., the build plate or window) may be reduced due to the absence of a requirement for extensive lateral "throw" as in the Joyce or Chen devices noted above, in the methods, systems and apparatus of the present invention lateral movement (including movement in the X and/or Y direction or combination thereof) of the carrier and object (if such lateral movement is present) is preferably not more than, or less than, 80, 70, 60, 50, 40, 30, 20, or even 10 percent of the width (in the direction of that lateral movement) of the build region.

While in some embodiments the carrier is mounted on an elevator to advance up and away from a stationary build plate, on other embodiments the converse arrangement may be used: That is, the carrier may be fixed and the build plate lowered to thereby advance the carrier away therefrom. Numerous different mechanical configurations will be apparent to those skilled in the art to achieve the same result.

Depending on the choice of material from which the carrier is fabricated, and the choice of polymer or resin from which the article is made, adhesion of the article to the carrier may sometimes be insufficient to retain the article on the carrier through to completion of the finished article or "build." For example, an aluminum carrier may have lower adhesion than a poly(vinyl chloride) (or "PVC") carrier. Hence one solution is to employ a carrier comprising a PVC on the surface to which the article being fabricated is polymerized. If this promotes too great an adhesion to conveniently separate the finished part from the carrier, then any of a variety of techniques can be used to further secure the article to a less adhesive carrier, including but not limited to the application of adhesive tape such as "Greener Masking Tape for Basic Painting #2025 High adhesion" to further secure the article to the carrier during fabrication.

3. Controller and Process Control.

The methods and apparatus of the invention can include process steps and apparatus features to implement process control, including feedback and feed-forward control, to, for example, enhance the speed and/or reliability of the method.

A controller for use in carrying out the present invention may be implemented as hardware circuitry, software, or a combination thereof. In one embodiment, the controller is a general purpose computer that runs software, operatively associated with monitors, drives, pumps, and other components through suitable interface hardware and/or software. Suitable software for the control of a three-dimensional printing or fabrication method and apparatus as described herein includes, but is not limited to, the ReplicatorG open source 3d printing program, 3DPrint™ controller software from 3D systems, Slic3r, Skeinforge, KISSlicer, Repetier-Host, PrintRun, Cura, etc., including combinations thereof.

Process parameters to directly or indirectly monitor, continuously or intermittently, during the process (e.g., during one, some or all of said filling, irradiating and advancing steps) include, but are not limited to, irradiation intensity, temperature of carrier, polymerizable liquid in the build zone, temperature of growing product, temperature of build plate, pressure, speed of advance, pressure, force (e.g., exerted on the build plate through the carrier and product being fabricated), strain (e.g., exerted on the carrier by the growing product being fabricated), thickness of release layer, etc.

Known parameters that may be used in feedback and/or feed-forward control systems include, but are not limited to, expected consumption of polymerizable liquid (e.g., from the known geometry or volume of the article being fabricated), degradation temperature of the polymer being formed from the polymerizable liquid, etc.

Process conditions to directly or indirectly control, continuously or step-wise, in response to a monitored parameter, and/or known parameters (e.g., during any or all of the process steps noted above), include, but are not limited to, rate of supply of polymerizable liquid, temperature, pressure, rate or speed of advance of carrier, intensity of irradiation, duration of irradiation (e.g. for each "slice"), etc.

For example, the temperature of the polymerizable liquid in the build zone, or the temperature of the build plate, can be monitored, directly or indirectly with an appropriate thermocouple, non-contact temperature sensor (e.g., an infrared temperature sensor), or other suitable temperature sensor, to determine whether the temperature exceeds the degradation temperature of the polymerized product. If so, a process parameter may be adjusted through a controller to reduce the temperature in the build zone and/or of the build plate. Suitable process parameters for such adjustment may include: decreasing temperature with a cooler, decreasing the rate of advance of the carrier, decreasing intensity of the irradiation, decreasing duration of radiation exposure, etc.

In addition, the intensity of the irradiation source (e.g., an ultraviolet light source such as a mercury lamp) may be monitored with a photodetector to detect a decrease of intensity from the irradiation source (e.g., through routine degradation thereof during use). If detected, a process parameter may be adjusted through a controller to accommodate the loss of intensity. Suitable process parameters for such adjustment may include: increasing temperature with a heater, decreasing the rate of advance of the carrier, increasing power to the light source, etc.

As another example, control of temperature and/or pressure to enhance fabrication time may be achieved with heaters and coolers (individually, or in combination with one another and separately responsive to a controller), and/or with a pressure supply (e.g., pump, pressure vessel, valves and combinations thereof) and/or a pressure release mechanism such as a controllable valve (individually, or in combination with one another and separately responsive to a controller).

In some embodiments the controller is configured to maintain the gradient of polymerization zone described herein (see, e.g., FIG. 1) throughout the fabrication of some or all of the final product. The specific configuration (e.g., times, rate or speed of advancing, radiation intensity, temperature, etc.) will depend upon factors such as the nature of the specific polymerizable liquid and the product being created. Configuration to maintain the gradient of polymerization zone may be carried out empirically, by entering a set of process parameters or instructions previously determined, or determined through a series of test runs or "trial and error"; the configuration may be provided through predetermined instructions; the configuration may be achieved by suitable monitoring and feedback (as discussed above), combinations thereof, or in any other suitable manner.

In some embodiments, the controller is configured to control a pressure and/or composition of a gas supplied to conduits described herein for increasing or decreasing fluid flow to chambers and/or gas conduits to channels in the build plate.

Figure 3:
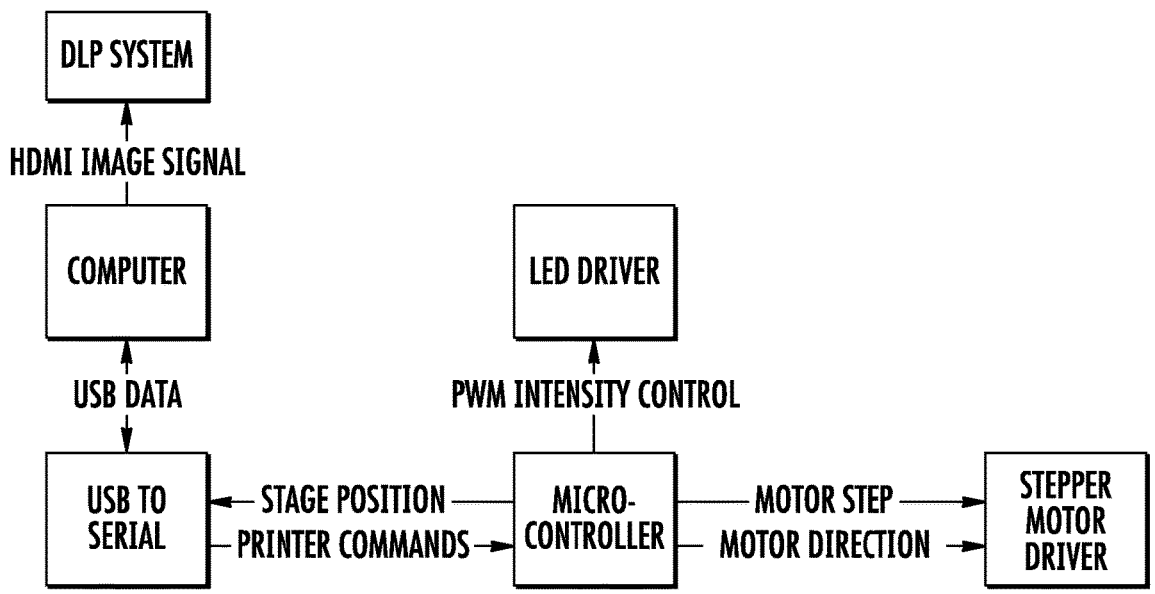
FIG. 3 is a first flow chart illustrating control systems and methods for carrying out the present invention.
Figure 4:
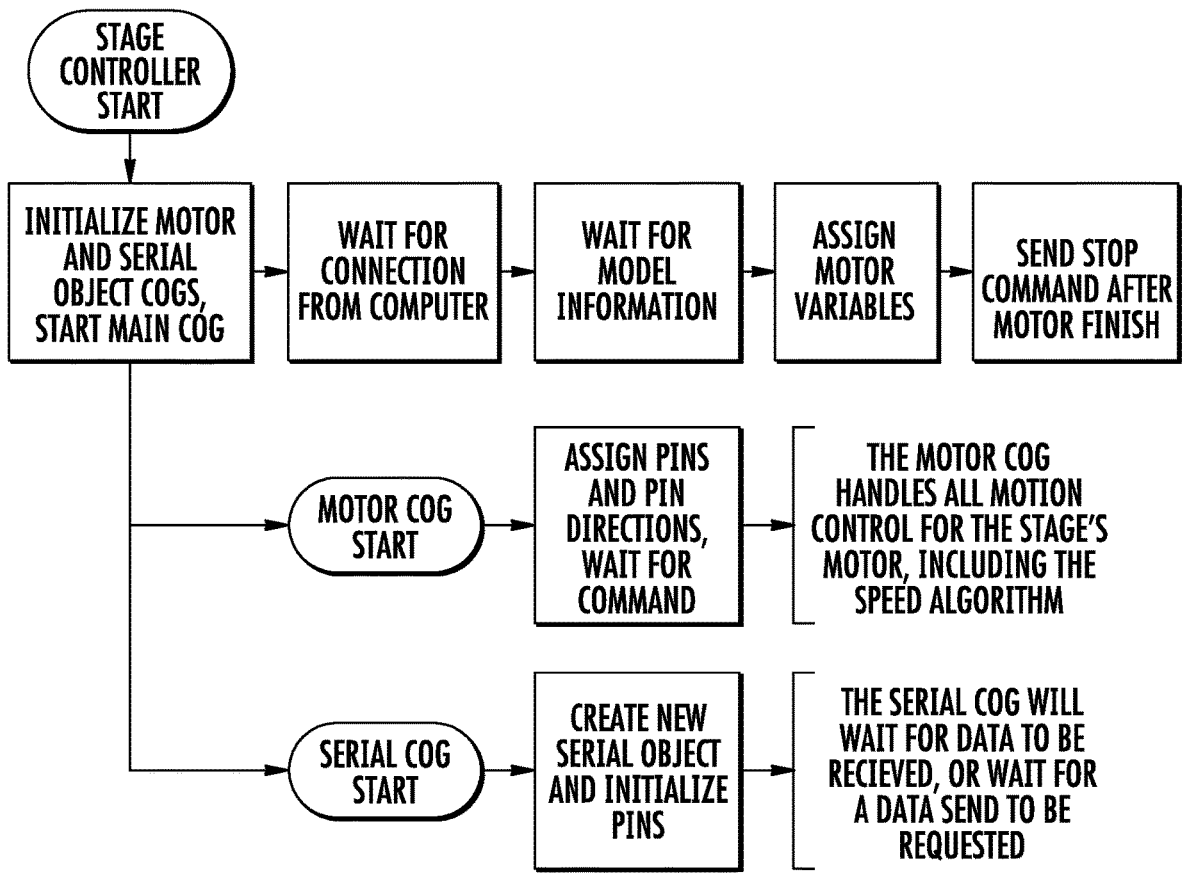
FIG. 4 is a second flow chart illustrating control systems and methods for carrying out the present invention.
Figure 5:
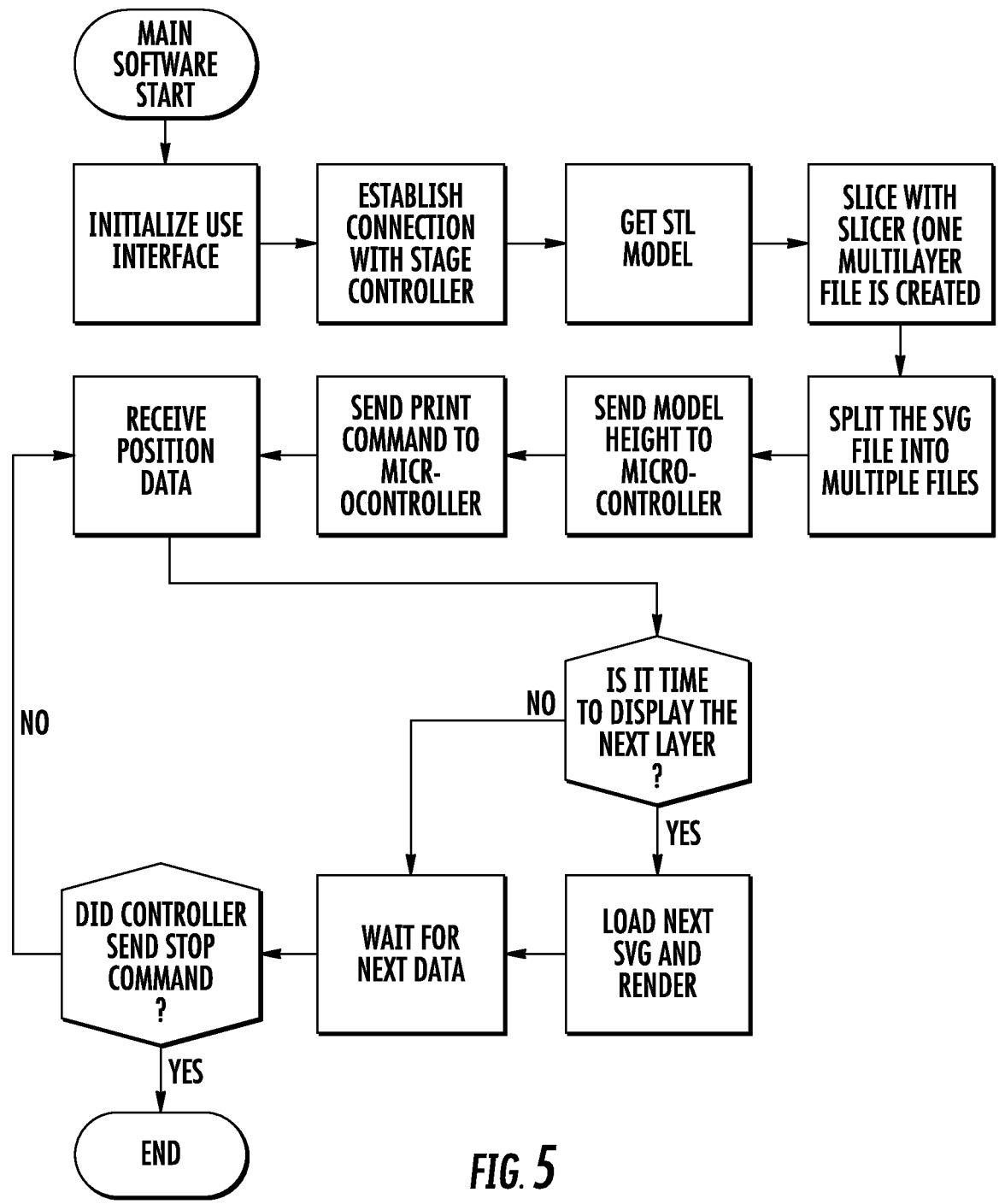
FIG. 5 is a third flow chart illustrating control systems and methods for carrying out the present invention.

In some embodiments, a method and apparatus as described above may be controlled by a software program running in a general purpose computer with suitable interface hardware between that computer and the apparatus described above. Numerous alternatives are commercially available. Non-limiting examples of one combination of components is shown in FIGS. 3 to 5, where "Microcontroller" is Parallax Propeller, the Stepper Motor Driver is Sparkfun EasyDriver, the LED Driver is a Luxeon Single LED Driver, the USB to Serial is a Parallax USB to Serial converter, and the DLP System is a Texas Instruments LightCrafter system.

4. General Methods.

As noted above, the present invention provides a method of forming a three-dimensional object, comprising the steps of: (a) providing a carrier and a build plate, said build plate comprising a semipermeable member, said semipermeable member comprising a build surface and a feed surface separate from said build surface, with said build surface and said carrier defining a build region therebetween, and with said feed surface in fluid contact with a polymerization inhibitor; then (concurrently and/or sequentially) (b) filing said build region with a polymerizable liquid, said polymerizable liquid contacting said build segment, (c) irradiating said build region through said build plate to produce a solid polymerized region in said build region, with a liquid film release layer comprised of said polymerizable liquid formed between said solid polymerized region and said build surface, the polymerization of which liquid film is inhibited by said polymerization inhibitor; and (d) advancing said carrier with said polymerized region adhered thereto away from said build surface on said stationary build plate to create a subsequent build region between said polymerized region and said top zone. In general the method includes (e) continuing and/or repeating steps (b) through (d) to produce a subsequent polymerized region adhered to a previous polymerized region until the continued or repeated deposition of polymerized regions adhered to one another forms said three-dimensional object.

Since no mechanical release of a release layer is required, or no mechanical movement of a build surface to replenish oxygen is required, the method can be carried out in a continuous fashion, though it will be appreciated that the individual steps noted above may be carried out sequentially, concurrently, or a combination thereof. Indeed, the rate of steps can be varied over time depending upon factors such as the density and/or complexity of the region under fabrication.

Also, since mechanical release from a window or from a release layer generally requires that the carrier be advanced a greater distance from the build plate than desired for the next irradiation step, which enables the window to be recoated, and then return of the carrier back closer to the build plate (e.g., a "two steps forward one step back" operation), the present invention in some embodiments permits elimination of this "back-up" step and allows the carrier to be advanced unidirectionally, or in a single direction, without intervening movement of the window for re-coating, or "snapping" of a pre-formed elastic release-layer. However, in other embodiments of the invention, reciprocation is utilized not for the purpose of obtaining release, but for the purpose of more rapidly filling or pumping polymerizable liquid into the build region.

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.)

In other embodiments of the invention, the advancing step is carried out continuously, at a uniform or variable rate.

In some embodiments, the rate of advance (whether carried out sequentially or continuously) is from about 0.1 1, or 10 microns per second, up to about to 100, 1,000, or 10,000 microns per second, again depending again depending on factors such as temperature, pressure, structure of the article being produced, intensity of radiation, etc.

As described further below, in some embodiments the filling step is carried out by forcing said polymerizable liquid into said build region under pressure. In such a case, the advancing step or steps may be carried out at a rate or cumulative or average rate of at least 0.1, 1, 10, 50, 100, 500 or 1000 microns per second, or more. In general, the pressure may be whatever is sufficient to increase the rate of said advancing step(s) at least 2, 4, 6, 8 or 10 times as compared to the maximum rate of repetition of said advancing steps in the absence of said pressure. Where the pressure is provided by enclosing an apparatus such as described above in a pressure vessel and carrying the process out in a pressurized atmosphere (e.g., of air, air enriched with oxygen, a blend of gasses, pure oxygen, etc.) a pressure of 10, 20, 30 or 40 pounds per square inch (PSI) up to, 200, 300, 400 or 500 PSI or more, may be used. For fabrication of large irregular objects higher pressures may be less preferred as compared to slower fabrication times due to the cost of a large high pressure vessel. In such an embodiment, both the feed surface and the polymerizable liquid can be in fluid contact with the same compressed gas (e.g., one comprising from 20 to 95 percent by volume of oxygen, the oxygen serving as the polymerization inhibitor.

On the other hand, when smaller items are fabricated, or a rod or fiber is fabricated that can be removed or exited from the pressure vessel as it is produced through a port or orifice therein, then the size of the pressure vessel can be kept smaller relative to the size of the product being fabricated and higher pressures can (if desired) be more readily utilized.

As noted above, the irradiating step is in some embodiments carried out with patterned irradiation. The patterned irradiation may be a fixed pattern or may be a variable pattern created by a pattern generator (e.g., a DLP) as discussed above, depending upon the particular item being fabricated.

When the patterned irradiation is a variable pattern rather than a pattern that is held constant over time, then each irradiating step may be any suitable time or duration depending on factors such as the intensity of the irradiation, the presence or absence of dyes in the polymerizable material, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or said gradient of polymerization zone and said dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

The method may further comprise the step of disrupting said gradient of polymerization zone/active surface, for a time sufficient to form a cleavage line in said three-dimensional object (e.g., at a predetermined desired location for intentional cleavage, or at a location in said object where prevention of cleavage or reduction of cleavage is non-critical), and then reinstating said gradient of polymerization zone (e.g. by pausing, and resuming, the advancing step, increasing, then decreasing, the intensity of irradiation, and combinations thereof In some embodiments the build surface is flat; in other the build surface is irregular such as convexly or concavely curved, or has walls or trenches formed therein. In either case the build surface may be smooth or textured.

Curved and/or irregular build plates or build surfaces can be used in fiber or rod formation, to provide different materials to a single object being fabricated (that is, different polymerizable liquids to the same build surface through channels or trenches formed in the build surface, each associated with a separate liquid supply, etc.

Carrier Feed Channels for Polymerizable Liquid.

While polymerizable liquid may be provided directly to the build plate from a liquid conduit and reservoir system, in some embodiments the carrier include one or more feed channels therein. The carrier feed channels are in fluid communication with the polymerizable liquid supply, for example a reservoir and associated pump. Different carrier feed channels may be in fluid communication with the same supply and operate simultaneously with one another, or different carrier feed channels may be separately controllable from one another (for example, through the provision of a pump and/or valve for each). Separately controllable feed channels may be in fluid communication with a reservoir containing the same polymerizable liquid, or may be in fluid communication with a reservoir containing different polymerizable liquids. Through the use of valve assemblies, different polymerizable liquids may in some embodiments be alternately fed through the same feed channel, if desired.

5. Reciprocating Feed of Polymerizable Liquid.

In an embodiment of the present invention, the carrier is vertically reciprocated (or oscillated) with respect to the build surface (that is, the two are vertically reciprocated with respect to one another) to enhance or speed the refilling of the build region with the polymerizable liquid. Such reciprocations or oscillations (these two terms being used interchangeably herein) may be of any suitable configuration, including uniform and non-uniform, and/or periodic or non-periodic, with respect to one another, so long as they are configured to enhance feed of the polymerizable liquid to the build surface.

In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the speed of the upstroke gradually accelerates (that is, there is provided a gradual start and/or gradual acceleration of the upstroke, over a period of at least 20, 30, 40, or 50 percent of the total time of the upstroke, until the conclusion of the upstroke, or the change of direction which represents the beginning of the downstroke. Stated differently, the upstroke begins, or starts, gently or gradually.

In some embodiments, the speed of the downstroke gradually decelerates (that is, there is provided a gradual termination and/or gradual deceleration of the downstroke, over a period of at least 20, 30, 40, or 50 percent of the total time of the downstroke. Stated differently, the downstroke concludes, or ends, gently or gradually.

While in some embodiments there is an abrupt end, or abrupt deceleration, of the upstroke, and an abrupt beginning or acceleration of the downstroke (e.g., a rapid change in vector or direction of travel from upstroke to downstroke), it will be appreciated that gradual transitions may be introduced here as well (e.g., through introduction of a "plateau" or pause in travel between the upstroke and downstroke). It will also be appreciated that, while each reciprocating step may be consist of a single upstroke and downstroke, the reciprocation step may comprise a plurality of 2, 3, 4 or 5 or more linked set of reciprocations, which may e the same or different in frequent and/or amplitude In some embodiments, the vertically reciprocating step is carried out over a total time of from 0.01 or 0.1 seconds up to 1 or 10 seconds (e.g., per cycle of an upstroke and a downstroke).

In some embodiments, the upstroke distance of travel is from 0.02 or 0.2 millimeters (or 20 or 200 microns) to 1 or 10 millimeters (or 1000 to 10,000 microns). The distance of travel of the downstroke may be the same as, or less than, the distance of travel of the upstroke, where a lesser distance of travel for the downstroke serves to achieve the advancing of the carrier away from the build surface as the three-dimensional object is gradually formed. Where a reciprocation step comprises multiple linked reciprocations, the sum distance of travel of all upstrokes in that set is preferably greater than the sum distance of travel of all downstrokes in that set, to achieve the advancing of the carrier away from the build surface as the three-dimensional object is gradually formed.

Preferably the vertically reciprocating step, and particularly the upstroke thereof, does not cause the formation of gas bubbles or a gas pocket in the build region, but instead the build region remains filled with the polymerizable liquid throughout the reciprocation steps, and the gradient of polymerization zone or region remains in contact with the "dead zone" and with the growing object being fabricated throughout the reciprocation steps. As will be appreciated, a purpose of the reciprocation is to speed or enhance the refilling of the build region, particularly where larger build regions are to be refilled with polymerizable liquid, as compared to the speed at which the build region could be refilled without the reciprocation step.

In some embodiments, the advancing step is carried out intermittently at a rate of 1, 2, 5 or 10 individual advances per minute up to 300, 600, or 1000 individual advances per minute, each followed by a pause during which an irradiating step is carried out. It will be appreciated that one or more reciprocation steps (e.g., upstroke plus downstroke) may be carried out within each advancing step. Stated differently, the reciprocating steps may be nested within the advancing steps.

In some embodiments, the individual advances are carried out over an average distance of travel for each advance of from 10 or 50 microns to 100 or 200 microns (optionally including the total distance of travel for each vertically reciprocating step, e.g., the sum of the upstroke distance minus the downstroke distance).

Apparatus for carrying out the invention in which the reciprocation steps described herein are implemented substantially as described above, with the drive associated with the carrier, and/or with an additional drive operatively associated with the transparent member, and with the controller operatively associated with either or both thereof and configured to reciprocate the carrier and transparent member with respect to one another as described above.

In the alternative, vertical reciprocation may be carried out by configuring the build surface (and corresponding build plate) so that it may have a limited range of movement up and down in the vertical or "Z" dimension, while the carrier advances (e.g., continuously or step-wise) away from the build plate in the vertical or "Z" dimension. In some embodiments, such limited range of movement may be passively imparted, such as with upward motion achieved by partial adhesion of the build plate to the growing object through a viscous polymerizable liquid, followed by downward motion achieved by the weight, resiliency, etc. of the build plate (optionally including springs, buffers, shock absorbers or the like, configured to influence either upward or downward motion of the build plate and build surface). In another embodiment, such motion of the build surface may be actively achieved, by operatively associating a separate drive system with the build plate, which drive system is also operatively associated with the controller, to separately achieve vertical reciprocation. In still another embodiment, vertical reciprocation may be carried out by configuring the build plate, and/or the build surface, so that it flexes upward and downward, with the upward motion thereof being achieved by partial adhesion of the build surface to the growing object through a viscous polymerizable liquid, followed by downward motion achieved by the inherent stiffness of the build surface biasing it or causing it to return to a prior position.

It will be appreciated that illumination or irradiation steps, when intermittent, may be carried out in a manner synchronized with vertical reciprocation, or not synchronized with vertical reciprocation, depending on factors such as whether the reciprocation is achieved actively or passively.

It will also be appreciated that vertical reciprocation may be carried out between the carrier and all regions of the build surface simultaneously (e.g., where the build surface is rigid), or may be carried out between the carrier and different regions of the build surface at different times (e.g., where the build surface is of a flexible material, such as a tensioned polymer film).

Figure 6:
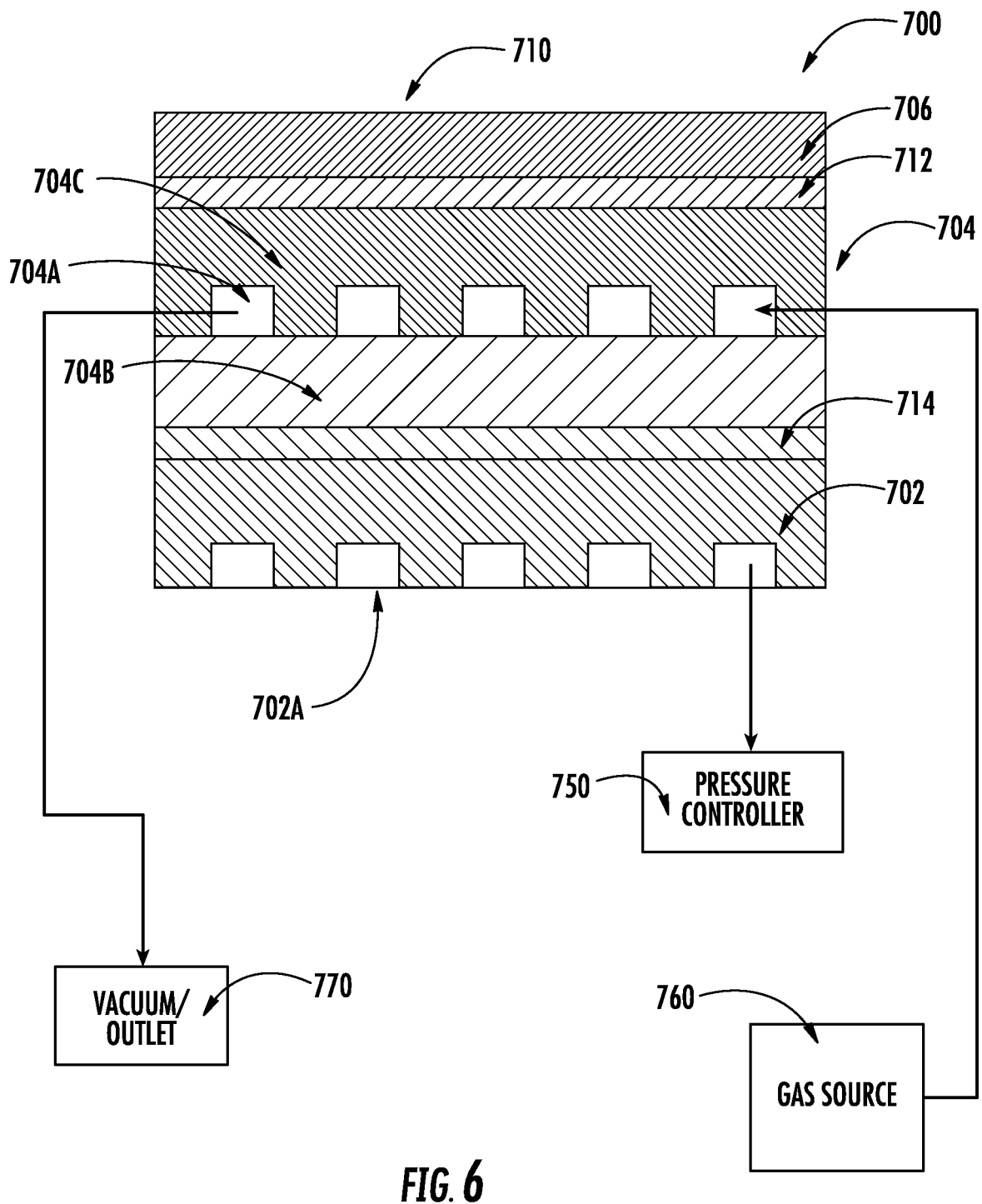
FIG. 6 is a side cross sectional view of a build plate with channel layers according to some embodiments.

6. Build Plates Having Reduced Pressure and/or Channels for Increased Fluid Flow As illustrated in FIG. 6, a build plate 700 for a three-dimensional printer is shown. The build plate 700 includes an optically transparent first channel layer 702, an optically transparent, gas permeable second channel layer on the first channel layer 704, and a flexible, optically transparent, gas-permeable sheet 706 having an upper and lower surface. The sheet upper surface forms a build surface 710 for forming a three-dimensional object. Adhesive layers 712 and 714 are between the channel layers 702 and 704, and between the channel layer 704 and the sheet 706, respectively. The channel layer 702 includes channels 702A that are fluidly connected to a pressure controller 750, and the channel layer 704 includes channels 704A that are fluidly connected to a gas source 760 on one side and a vacuum or outlet 770 on the other side. As illustrated, the channel layer 704 includes a planar portion 704B with a bottom surface that is adhered to the channel layer 702 by the adhesive layer 714 and a top surface. The channel layer 704 also includes a channel-defining portion 704C on the top surface of the planar portion 704B. It should be understood that "channels" in the channel layers 702, 704 include asymmetric cavities or irregular surfaces or other configurations that permit fluid flow therein.

The sheet 706 may be formed of any suitable semipermeable or permeable material (that is, permeable to the polymerization inhibitor) including amorphous fluoropolymers as described herein. For example, the polymer film or polymer film layer may, for example, be a fluoropolymer film, such as an amorphous thermoplastic fluoropolymer like TEFLON AF 1600™ or TEFLON AF2400™ fluoropolymer films, or perfluoropolyether (PFPE), particularly a cross-linked PFPE film, or a crosslinked silicone polymer film. The channel layer 704 may include or be provided by a gas permeable or semipermeable material, such as a permeable polymer (e.g., poly(dimethylsiloxane) (PDMS). The thickness of the sheet 706 may be less than about 150 μm. The planar portion 704B and the channel-defining portion 704C may be adhered together by chemical bonding including oxidative treatments, including oxygen plasma treatments, UV ozone treatments and/or wet chemical treatments. The adhesive layer 714 may be gas-permeable adhesives, such as a poly(dimethylsiloxane) (PDMS) film. In this configuration, the gas source 760 may increase/decrease the flow through the channels 704A to the vacuum/outlet 770. The gas flow in the channels 704A may increase or decrease the flow of gas through the channel layer 704, the adhesive layer 712 and the sheet 706, which are gas permeable and may increase the gas polymerization inhibitor present on the build surface 710. For example, the gas source 760 may be an oxygen gas source or other gas for inhibiting polymerization at the build surface 710. Although the channels 702A and 704A are illustrated as being parallel to one another, it should be understood that the channels 702A and 704A may be generally orthogonal to one another to improve optical qualities of the build plate 700.

In some embodiments, enrichment of the atmosphere with a polymerization inhibitor, such as oxygen, may be used. For example, pressure controller 750 may supply a gas to the chamber that is oxygen enriched, for example, to maintain a high oxygen partial pressure despite a reduced total gas pressure at the build plate surface or to enable less permeable build windows while still permitting sufficient oxygen or other polymerization inhibitor to be present in the build region.

The build plate 700 may be sufficiently thin and/or flexible such that the build plate 700 may curve or bend. In some embodiments, the build plate 700 has a thickness of between 10, 20, 30, 50, 100, 200, 300, 400, 500, 600, 700, 800, 900 microns and 1, 2, 3, 4, 5, 6, 7, 8, 9 or 10 millimeters. In some embodiments, the build plate 700 has a Young's modulus of about 70-80 GPa and/or a Vickers Hardness of about 500-750 kgf/mm$^2$.

For example, the pressure controller 750 may increase or decrease the pressure in the channels 702A of the channel layer 702 such that the build plate 700 may be flexed upward (increased pressure) or downward (decreased pressure). The pressure controller 750 may be connected to the channels 702A by a chamber or conduit that includes the channels 702A as discussed with respect to FIG. 7 below. In some embodiments, the channels 702A may be fluidly connected to one another, for example, by a connecting channel or channels, such that a fluid connection between the pressure controller 750 and any one of the channels 702A may be sufficient to control the pressure in all of the channels 702A. Accordingly, the pressure in the channels 702A may be controlled by the pressure controller 750. As discussed above, the build plate 700 (or a portion or layer thereof, such as a top layer or top portion) may be flexible. During the build, as the carrier/object moves away from the build surface 710, the build plate 700 may flex in an upward direction such as in the shape of a dome. It should be understood that other flexed shapes are possible, including asymmetrical shapes or "waves" that propagate from one end of the build plate to another, for example, as shown in International Patent Publication No. 2016/149104, the disclosure of which is hereby incorporated by reference in its entirety. As the build plate 700 continues to flex upward, the pressure controller 750 may reduce the pressure in the channels 702A to exert a downward force on the build plate 700 until the build plate 700 generally returns to and is pulled back to a generally planar position. When the build plate 700 returns to a planar position, the movement of the build plate 700 may aid in pulling additional polymerizable liquid (e.g., resin) into the build region under the object/carrier. Accordingly, the oscillation of the build plate 700 may be sufficient to enhance or speed a refilling of the build region with polymerizable liquid. In addition, the pressure controller 750 may increase the speed of oscillation and/or the force with which the build plate 700 moves from a dome-shaped or flexed position to the planar position, which may increase the flow of polymerizable liquid into the build region on the build surface 710.

In some embodiments, the pressure controller 750 may be capable of increasing and decreasing the pressure in the channels 702A above and below atmospheric pressure; however, the pressure controller 750 may also be provided by a vacuum pump that reduces pressure in the channels 702A, which exerts a reduced pressure (e.g., less than atmospheric pressure or less than a pressure on an opposing side of the sheet) on the bottom of the build plate 700 to increase the speed of oscillations and/or the force with which the build plate 700 returns from a position that is flexed upward to the planar position. Moreover, the pressure controller 750 can control a content of the gas delivered to the channels 702A, for example, to supply a desired amount of oxygen or nitrogen. In some embodiments, an amount of oxygen is increased and an amount of nitrogen is decreased as compared to air. The gas composition may be controlled together with the pressure by the pressure controller. 750.

Figure 7:
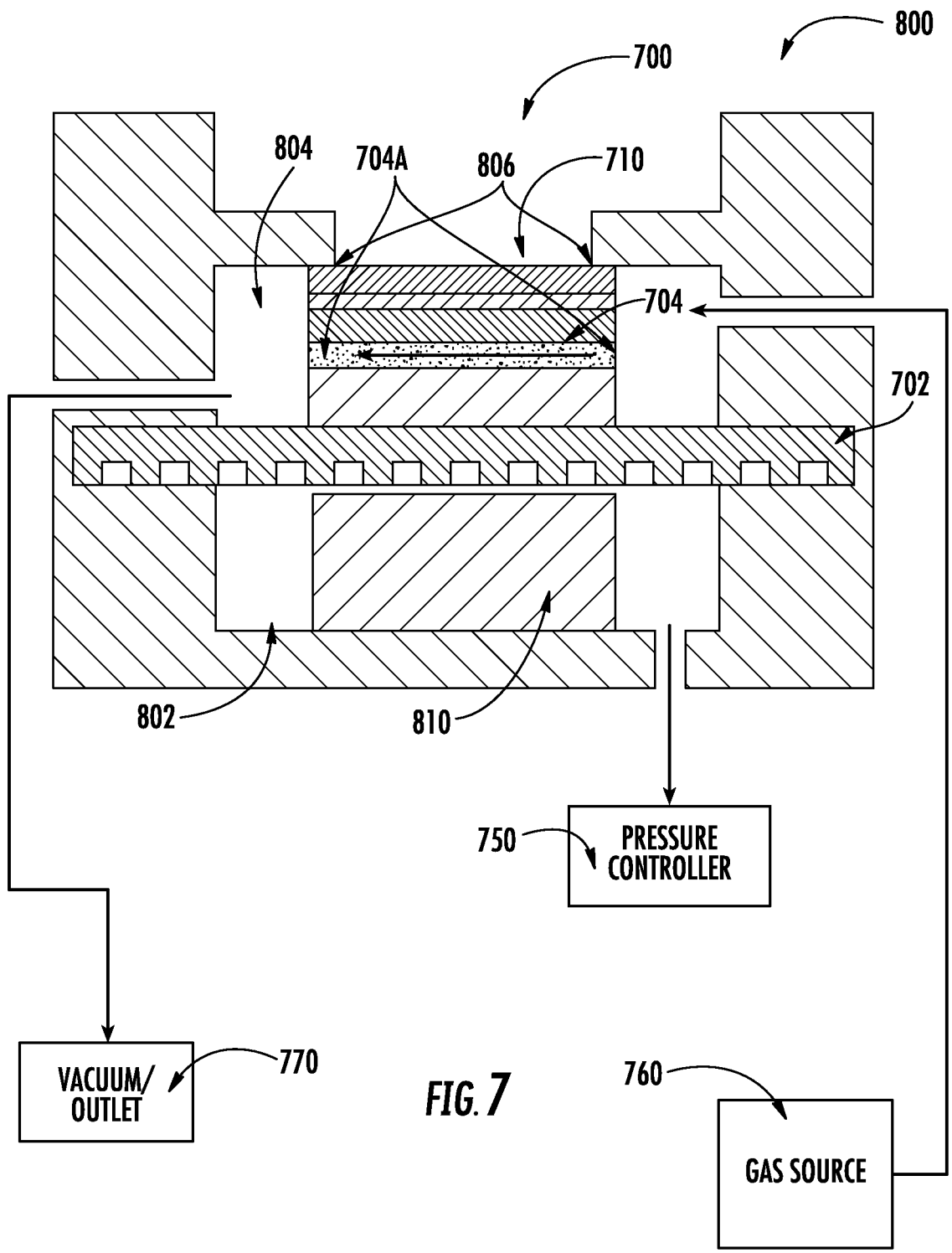
FIG. 7 is a side cross sectional view of a build plate with channel layers according to some embodiments.

As illustrated in FIG. 7, the build plate 700 may be held in position to provide a build surface 710 for a three-dimensional printer by a housing 800. As illustrated, the channel layer 702 is wider than the other layers of the build plate 700 such that the channel layer 702 is held under tension by a clamp in the housing 800. When the build plate 700 is in the housing 800, the housing 800 forms a lower chamber 802 that is fluidly connected to the pressure controller 750 and an upper chamber 804 that is fluidly connected to the gas source 760 and vacuum/outlet 770. The upper and lower chambers 802 and 804 are separated by the channel layer 702. A sealing member 806, such as caulk or other sealing materials, may be provided on the edges of the upper surface of the build plate 700 at the intersection with the housing 800 to reduce or prevent polymerizable fluid (e.g., resin) from entering the chamber 804. A base 810 may be included in the lower chamber 802 to provide additional planar support to the build plate 700. The base 810 may be formed of sapphire, glass, polymer and/or quartz and positioned on a bottom surface of the channel layer 702.

Although embodiments according to the invention are described with respect to upper and lower chambers 802 and 804 as connected to the pressure controller 750 and gas source 760/vacuum outlet 770, respectively, it should be understood that any suitable conduit may be used to provide pressure control and/or a gas source to the channel layers 702, 704.

In this configuration, the flow of a polymerization inhibitor gas from the gas source 760 to the vacuum/outlet 770 through the channels 704 may be increased and/or the pressure of the gas increased such that additional polymerization inhibitor reaches the build surface 710. In addition, flexing of the build plate 700 during the build may be controlled by the pressure controller 750 such that oscillations may be controlled or increased in frequency to increase the flow of polymerizable fluid to the build surface 710. These features may increase a build speed of a three-dimensional object due to an increased presence of a polymerization inhibitor gas at the build surface and an increase in oscillations to draw more polymerizable fluid to the build surface 710.

7. Methods for Reducing Bubbles by De-Gassing Through Build Plate

In some embodiments, the pressure and gas supply to the build plate may be controlled to reduce bubble or voids formed by excess gasses in the polymerizable fluid (e.g., resin) of in the 3D printing process and apparatus of FIGS. 1 and 2. Although the methods described herein may be performed by controlling a pressure and/or content of the gas supplied to the build plate using a pressure controller/gas supply, such as the gas source 760 and vacuum/outlet 770 described with respect to FIGS. 6 and 7, it should be understood that any suitable system may be used, including alternative build plates. For example, any permeable build plate may be positioned such that the side opposite the build surface is in a pressure-controlled chamber, or any suitable configuration of pressure-pressure controlled channels may be used.

Figure 8A:
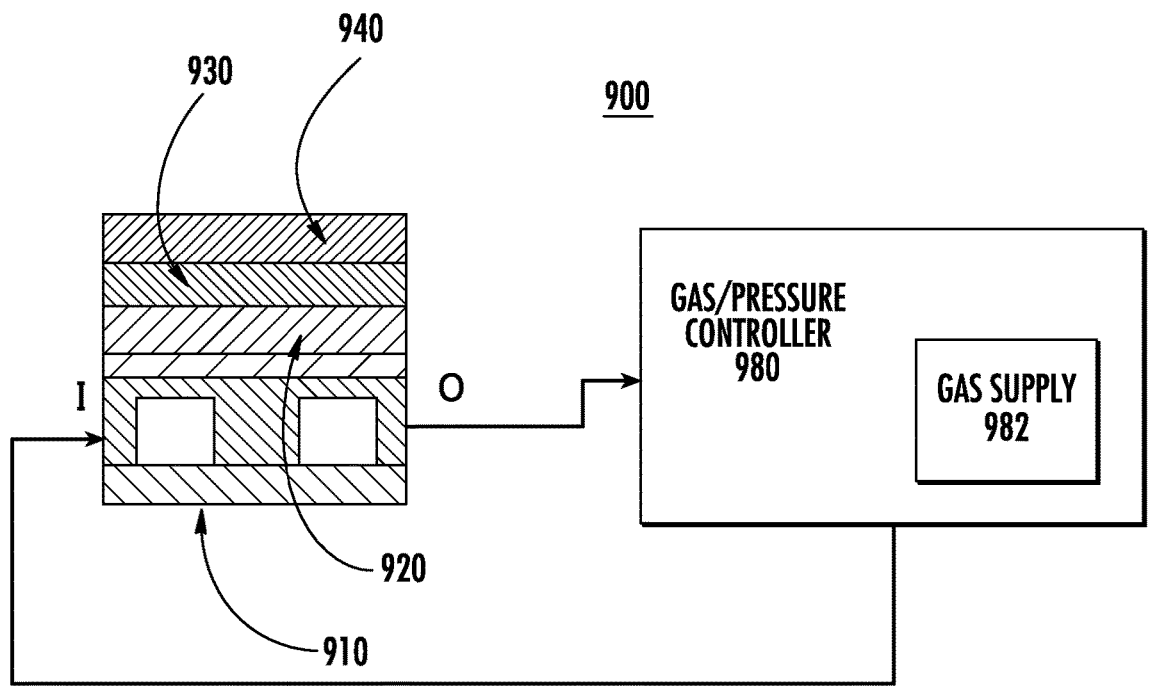
FIGS. 8A-8D are cross sectional view schematic diagrams of a three-dimensional printing system according to some embodiments.
Figure 9:
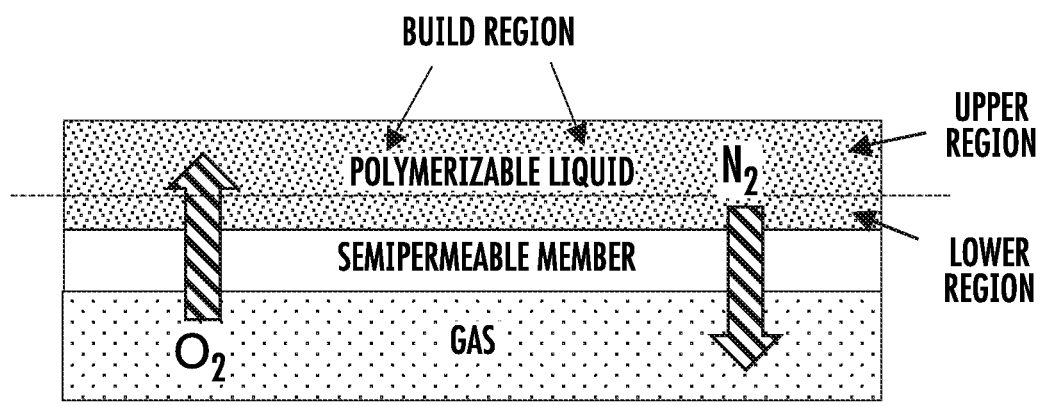
FIG. 9 is a cross sectional view of a build plate according to some embodiments.

With reference to FIG. 8A, the 3D printing apparatus 900 includes channel layer 910 and a sheet or build plate 920, which may be used to provide the optically transparent member or build plate in the system of FIG. 2. The channel layer 910 may formed of a gas permeable material, and may be used to provide gas to the build region through the build plate 920, and the gas composition and/or pressure in the channel layer 910 may be controlled to provide a reduced pressure (e.g., less than atmospheric pressure or less than a pressure on an opposing side of the build plate 920) and/or modified gas composition through the build plate 920 to the build region. A resin or polymerizable fluid in the build region forms a "dead zone" 930 and a polymerized or partly polymerized solid 940. A gas/pressure controller 980 and gas supply 982 provides one or more gases to the channel layer 910 such that the gas supplied by the controller 980 is supplied with a controlled gas content and pressure via an inlet I and outlet O and permeates through the build plate 920 to the build surface and the dead zone 930. An example of the flow of a polymerization inhibitor, such as oxygen, into the polymerizable liquid/build region and the flow of a bubble forming gas, such as nitrogen, out of the polymerizable liquid due to an oxygen-enriched gas at lower than atmospheric pressure on a side of the build plate (semipermeable member) opposite the build region is shown in FIG. 9.

Figures 8B, 8C, 8D:
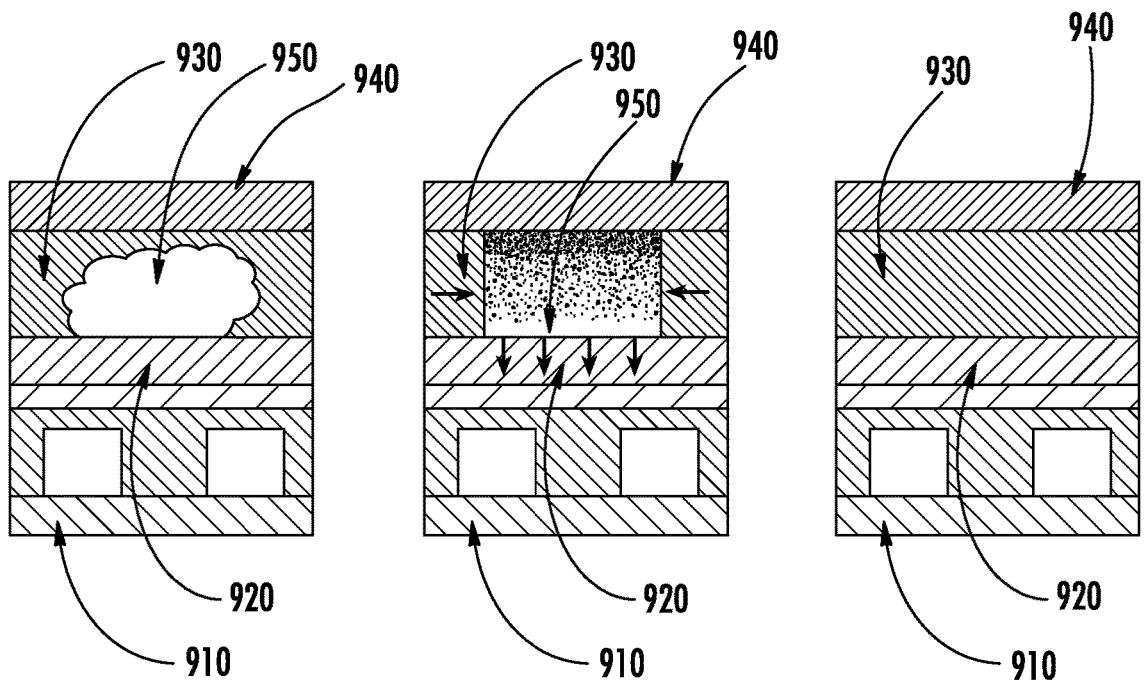

As the carrier moves upward as shown in FIG. 8B, the build region is filled with additional polymerizable liquid. For example, if the gas content and/or pressure of the channel layer 910 is air at atmospheric pressure, excess gas in the dead zone 920 may form a bubble 950 or gap region. For example, dissolved gas may coalesce and form gaps in the polymerizable liquid. In some embodiments, controlling the gas content and/or pressure of the channel layer 910 may reduce or prevent bubbles 950 from forming.

For example, oxygen gas may act as a polymerization inhibitor, while nitrogen gas generally does not inhibit polymerization, but may instead form bubbles 950 in the polymerized solid 940. Air contains significant amounts of nitrogen (around 80% nitrogen) and about 20% oxygen, and therefore, if air is used as the polymerization inhibitor, the nitrogen in air may cause bubbles 950 to form in the solid 940. In some embodiments, the gas content of the polymerized gas supplied to the channel layer 910 may be selected to reduce the amount of nitrogen and increase the amount of oxygen such that the formation of the bubbles 950 is reduced or eliminated. The oxygen-enriched gas may be provided at a reduced pressure, and/or the oxygen-enriched gas provided to the build surface via the channel layer 910 can be greater than the 20% oxygen content of air. In particular embodiments, the oxygen content of the gas provided to the build surface via the channel layer 910 is about 0.2 atm and is at or nearly at 100% oxygen, which is approximately the same oxygen content of air with the nitrogen substantially removed.

In some embodiments, the oxygen-enriched gas (or nitrogen-reduced gas or a gas with a relatively high proportion of polymerization inhibitor gas with a relatively low proportion of bubble-producing or non-polymerization inhibitor gas) is provided at a continuous pressure such that bubble formation is reduced or eliminated. However, the gas compositions discussed above or a reduced pressure may be intermittently applied to the polymerizable liquid through the optically transparent member to thereby reduce a gas content of the polymerizable liquid. The carrier may be either continuously or intermittently advanced (e.g., sequentially or concurrently with said irradiating step) away from the build surface to form the three-dimensional object from the solid polymer. The carrier may be stationary during the application of reduced pressure to the build surface and resume movement away from the build plate after the step of applying reduced pressure is finished. Thus, the steps of intermittently applying a reduced pressure to the polymerizable liquid through the optically transparent member and supplying a polymerization inhibitor gas to the polymerizable liquid may be alternated repeatedly. For example, as illustrated in FIG. 8C, if bubbles are formed, a particular gas composition and/or pressure may be applied via the channels in the channel layer 910 to remove the gas in the polymerizable liquid in the dead zone 930 to remove gaps and bubbles in the polymerizable liquid which may otherwise be formed in the solid object 940 as shown in FIG. 8D. In some embodiments, the thickness of the dead zone 930 may also be controlled, for example, by applying a type of gas or a reduced pressure gas to the sheet 930 or build plate to remove gases in the polymerizable liquid and reduce a thickness of the dead zone 930 in which polymerization inhibitor gas inhibits polymerization of the liquid.

The polymerization inhibitor gas may be supplied to the polymerizable liquid through the optically transparent member in various configurations as described herein.

The amount and duration of the reduced pressure applied to the polymerizable liquid through the optically transparent member is preferably sufficient to reduce a gas concentration in the polymerizable liquid. The pressure may be at 0%, 5%, 10%, 20%, 25%, 30%, 40% to 50%, 60%, 70%, 80%, 90% or 100% of atmospheric pressure. The oxygen or polymerization inhibitor gas composition of the gas supplied may be 20%, 25%, 30%, 40% to 50%, 60%, 70%, 80%, 90% or 100% oxygen.

In embodiments, the polymerizable fluid has a gradient of gas concentration, which determines an amount of irradiation or "dose" to cure the polymerizable liquid. For example, the polymerizable fluid can have a lower region on the optically transparent member, and an upper region on the lower region opposite the optically transparent member such that the lower region has a higher dose to cure than the upper region. The applied reduced pressure to the polymerizable liquid through the optically transparent member may reduce a gas concentration in the upper region, while maintaining the polymerization inhibitor gas in the lower region, which consequently reduces a thickness of the dead zone. In some embodiments, the thickness of the lower region is less than about 1000 microns or between about 1, 2, 5, 10, 20 50, 100, 200 300 to 400, 500, 600, 700, 800, 900 or 1000 microns.

In some embodiments, oxygen gas may be used as the polymerization inhibitor. Oxygen may be supplied at any suitable pressure, and is preferably supplied at a pressure that is less than atmospheric pressure. In particular embodiments, the pressure of the oxygen is substantial equal to a partial pressure of oxygen in air at atmospheric pressure (e.g., 100% oxygen supplied at about 0.2 atm). The polymerization inhibitor gas may also be substantially devoid of nitrogen or other gases that do not substantially contribute to polymerization inhibition in the dead zone.

Without wishing to be bound by any particular theory, resins that are saturated with gas are prone to degassing when the local pressure drops. Large pressure drops can occur during the build platform movement and resin refill. When the separation of the printed part and window result in gas coalescence, voids may be formed in the printed part. Accordingly, controlling the pressure of a gas or applying a vacuum through the gas permeable build plate may reduce the level of dissolved gases prior to the pressure change, and reducing an amount of dissolved gas may increase the pressure differential that the resin can experience prior to void formation. The build plate is permeable to gasses, and equilibrium may be established at the build plate/resin interface relatively quickly. Cycling between air (or oxygen) and vacuum for printing formation and part movement, respectively, may permit the CLIP process to be performed with a maximum pressure differential on the resin prior to void formation the part. Moreover, the removal of nitrogen, which is not an active component of polymerization inhibition, may reduce the overall gas level and further reduce the formation of bubbles or voids in the printed part.

In addition, while oxygen delivery to the interface between the polymerizable fluid and the build plate is desirable, oxygen in the regions of the polymerization fluid that are further away from the interface may lead to a larger dosage of irradiation to cure the polymerizable fluid, which results in a longer exposure time and slower print speeds. Reducing the overall oxygen level may lead to faster cure times, by may lead to difficulty maintaining sufficient oxygen at the interface for the CLIP process to be effective. Moreover, since the light intensity decays as it passes through the polymerization fluid, the percent monomer to polymer conversions may not be constant throughout the exposed region. Controlling a level of oxygen concentration may reduce exposure times and increase print speeds by effectively maintaining a level of oxygen at the build plate and polymerization fluid interface. The oxygen concentration profile may also be controlled to provide more consistent percent monomer to polymer conversions in view of variations of light intensity.

8. Additional Build Plate Materials

Any suitable material may be used to form the build plates described herein, including multi-layer build plates and/or build plates formed of more than one material. For example, the flexible layer (used alone or with additional supports or layers) may include a woven glass fabric (fiberglass or e-glass) with a crosslinked silicone elastomeric coating (such as room temperature vulcanized (RTV) silicone), which may be lightly infiltrated into the glass fiber fabric to provide mechanical durability. The oxygen permeability of silicone elastomer (rubber) is similar to Teflon® AF-2400. Such a configuration may be used alone or affixed (adhesively adhered) to a glass plate with the unfilled areas of the fabric available for air (oxygen) flow. Sulfonated tetrafluoroethylene based fluoropolymer-copolymers, such as Nafion® from Dupont may also be used.

In some embodiments, asymmetric flat sheet membranes which are currently used in very high quantity for water purification applications (see U.S. Patent Publication No. 2014/0290478) may be used. These membranes are generally polysulfone or polyethersulfone, and may be coated with perfluoropolymers or crosslinked silicone elastomer to increase chemical resistance. Also poly(vinylidene fluoride) and possibly polyimide asymmetric (porous) membranes may be used, for example, if chemical resistance is a problem. Some of the membranes may be used as is without coatings. Examples of such membranes include FilmTec® membranes (Dow Chemical, Midland, Mich. (USA)). These are porous polysulfone asymmetric membranes coated with a crosslinked high Tg polyamide (with a coating thickness of about 0.1 microns). The crosslinked polyamide coating should provide chemical resistance. Although the oxygen permeability of the polyamide is low, the thickness of the coating may be so low that the effective oxygen transmission rate is high. The polysulfone support without the polyamide layer could be coated with a wide variety of polymers such as silicone rubber (or AF-2400) to yield very high oxygen transmission. The FilmTec® membranes are produced in very high quantity as they are the prime material used in water desalination plants. PVDF porous membranes may allow repeated use.

9. Build Plate Coatings

Omniphobic surfaces may be used on the build plate surface or build region. For example, patterned surfaces (either a random array of particles or micro patterned surfaces) that contain non-miscible fluids that are pinned or held to the surface by capillary forces may be used. Such a surface may result in fluid on the surface floating along the surface. Examples of such surfaces are described in U.S. Pat. Nos. 8,535,779 and 8,574,704, the disclosures of which are hereby incorporated by reference in their entireties.

10. Build Plate Flexible Layers

Although embodiments according to the present invention are described with respect to flexible layers on the build plate that include a semipermeable (or gas permeable) member (e.g., perfluoropolymers, such as TEFLON AF® fluoropolymers, it should be understood that any suitable flexible material may be used in the configurations described herein. For example, a transparent, resilient paper, such as glassine, may be used. Glassine is a relatively transparent, greaseproof paper formed of well-hydrated cellulosic fibers that has been super calendared. Glassine may be plasticized and/or coated with wax or a glaze. Glassine may be gas permeable. In some embodiments, the glassine may be coated with a thin layer of crosslinked silicone elastomer or a perfluoropolymer, such as TEFLON AF® fluoropolymers. Glassine paper is substantially grease resistant, and may have limited adhesion to the polymerizable liquid described herein.

While the present invention has been described in connection with polymerizable liquids, those skilled in the art will appreciate that the methods and apparatus described herein may be used with any suitable solidifiable liquid, including organic and inorganic materials. In some embodiments, "dual cure" polymerizable liquids (or "resins"), and methods that may be used in carrying out the present invention include, but are not limited to, those set forth in J. Rolland et al., Method of Producing Polyurethane Three-Dimensional Objects from Materials having Multiple Mechanisms of Hardening, PCT Publication No. WO 2015/200179 (published 30 Dec. 2015); J. Rolland et al., Methods of Producing Three-Dimensional Objects from Materials Having Multiple Mechanisms of Hardening, PCT Publication No. WO 2015/200173 (published 30 Dec. 2015); J. Rolland et al., Three-Dimensional Objects Produced from Materials Having Multiple Mechanisms of Hardening, PCT Publication No. WO/2015/200189 (published 30 Dec. 2015); J. Rolland et al., Polyurethane Resins Having Multiple Mechanisms of Hardening for Use in Producing Three-Dimensional Objects published 30 Dec. 2015); and J. Rolland et al., Method of Producing Three-Dimensional Objects from Materials having Multiple Mechanisms of Hardening, U.S. patent application Ser. No. 14/977,822 (filed 22 Dec. 2015); J. Rolland et al., Method of Producing Polyurethane Three-Dimensional Objects from Materials having Multiple Mechanisms of Hardening, U.S. patent application Ser. No. 14/977,876 (filed 22 Dec. 2015), J. Rolland et al., Three-Dimensional Objects Produced from Materials having Multiple Mechanisms of Hardening, U.S. patent application Ser. No. 14/977,938 (filed 22 Dec. 2015), and J. Rolland et al., Polyurethane Resins having Multiple Mechanisms of Hardening for Use in Producing Three-Dimensional Objects, U.S. patent application Ser. No. 14/977,974 (filed 22 Dec. 2015); the disclosures of all of which are incorporated by reference herein in their entirety.

While the present invention is preferably carried out by continuous liquid interphase polymerization, as described in detail above, in some embodiments alternate methods and apparatus for bottom-up three-dimension fabrication may be used, including layer-by-layer fabrication. Examples of such methods and apparatus include, but are not limited to, those described U.S. Pat. No. 7,438,846 to John and U.S. Pat. No. 8,110,135 to El-Siblani, and in U.S. Patent Application Publication Nos. 2013/0292862 to Joyce and 2013/0295212 to Chen et al. The disclosures of these patents and applications are incorporated by reference herein in their entirety.

The foregoing is illustrative of the present invention, and is not to be construed as limiting thereof. The invention is defined by the following claims, with equivalents of the claims to be included therein.

That which is claimed is:

1. An apparatus for forming a three-dimensional object from a polymerizable liquid, comprising:
   (a) a support;
   (b) a carrier operatively associated with said support on which carrier said three-dimensional object is formed;
   (c) a gas permeable optically transparent member having a build surface, with said build surface and said carrier defining a build region therebetween;
   (d) a liquid polymer supply operatively associated with said build surface and configured to supply liquid polymer into said build region for solidification or polymerization;
   (e) a radiation source configured to irradiate said build region through said optically transparent member to form a solid polymer from said polymerizable liquid;
   (f) optionally at least one drive operatively associated with either said transparent member or said carrier;

(g) a controller operatively associated with said carrier, and/or optionally said at least one drive, and said radiation source for continuously or intermittently advancing said carrier away from said build surface to form said three-dimensional object from said solid polymer, (h) a gas/pressure controller in fluid communication with said optically transparent member configured to control a pressure and/or supply a gas to said build surface through said gas permeable member, wherein said gas/pressure controller is configured to apply a reduced pressure and oxygen-enriched gas to the polymerizable liquid through the optically transparent member to thereby reduce a nitrogen content of the polymerizable liquid by supplying oxygen through the optically transparent member into the polymerizable liquid while withdrawing nitrogen from the polymerizable liquid through the optically transparent member.

2. The apparatus of claim 1, further comprising:
wherein oxygen-enriched gas is supplied to the polymerizable liquid through the optically transparent member at a substantially constant pressure.

3. The apparatus of claim 1, wherein said reduced pressure and oxygen-enriched gas is supplied at a pressure less than atmospheric pressure.

4. The apparatus of claim 1, wherein the oxygen-enriched gas is about 80%-100% oxygen.

5. The apparatus of claim 1, wherein the pressure of the oxygen-enriched gas is substantial equal to a partial pressure of oxygen in air at atmospheric pressure.

6. The apparatus of claim 1, wherein said optically transparent member comprises a build plate comprising a channel layer configured to connect to a gas and/or pressure controller.

7. The apparatus of claim 1, wherein said controller is configured to control said carrier, and/or optionally said at least one drive, and said radiation source such that the liquid polymer supply fills the build region, the radiation source irradiates said build region, and/or said carrier advances away from said build surface while said apparatus also concurrently:
(i) continuously maintains a dead zone of polymerizable liquid in contact with said build surface, and
(ii) continuously maintains a gradient of polymerization zone between said dead zone and said solid polymer and in contact with each thereof, said gradient of polymerization zone comprising said polymerizable liquid in partially cured form.

8. The apparatus of claim 7, wherein said gas/pressure controller is configured to intermittently apply a reduced pressure to the polymerizable liquid through the optically transparent member to thereby reduce a nitrogen content of the polymerizable liquid that is sufficient to maintain a dead zone of less than 1000 microns by reducing a gas concentration in the polymerizable liquid.

9. The apparatus of claim 8, wherein said carrier with said polymerized region adhered thereto is configured to unidirectionally advance away from the build surface on a stationary build plate.

10. The apparatus of claim 9, wherein said controller is configured to fill said build region by vertically reciprocating said carrier with respect to said build surface to enhance or speed the refilling of said build region with said polymerizable liquid.

11. The apparatus of claim 1, wherein said controller is configured to reduce or hold stationary advancement of the carrier when a reduced pressure is applied to the polymerizable liquid through the optically transparent member.

12. An apparatus for forming a three-dimensional object from a polymerizable liquid, comprising:
(a) a support;
(b) a carrier operatively associated with said support on which carrier said three-dimensional object is formed;
(c) a gas permeable optically transparent member having a build surface, with said build surface and said carrier defining a build region therebetween;
(d) a liquid polymer supply operatively associated with said build surface and configured to supply liquid polymer into said build region for solidification or polymerization;
(e) a radiation source configured to irradiate said build region through said optically transparent member to form a solid polymer from said polymerizable liquid;
(f) optionally at least one drive operatively associated with either said transparent member or said carrier;
(g) a controller operatively associated with said carrier, and/or optionally said at least one drive, and said radiation source for continuously or intermittently advancing said carrier away from said build surface to form said three-dimensional object from said solid polymer,
(h) a gas/pressure controller in fluid communication with said optically transparent member configured to control a pressure and/or supply a gas to said build surface through said gas permeable member, wherein said gas/pressure controller is configured to
apply a reduced pressure and oxygen-enriched gas to the polymerizable liquid through the optically transparent member to thereby reduce a nitrogen content of the polymerizable liquid by supplying oxygen through the optically transparent member into the polymerizable liquid while withdrawing nitrogen from the polymerizable liquid through the optically transparent member; and
intermittently reducing a pressure of the oxygen-enriched gas.

13. The apparatus of claim 12, wherein said gas/pressure controller is configured to supply the oxygen-enriched gas to the polymerization liquid by supplying the oxygen-enriched gas at a pressure less than atmospheric pressure.

14. The apparatus of claim 13, wherein the oxygen-enriched gas is about 80%-100% oxygen.

15. The apparatus of claim 13, wherein the pressure of the oxygen-enriched gas is substantial equal to a partial pressure of oxygen in air at atmospheric pressure.

16. The apparatus of claim 12, wherein said optically transparent member comprises a build plate comprising a channel layer configured to connect to a gas and/or pressure controller.

17. The apparatus of claim 12, wherein said controller is configured to control said carrier, and/or optionally said at least one drive, and said radiation source such that the liquid polymer supply fills the build region, the radiation source irradiates said build region, and/or said carrier advances away from said build surface while said apparatus also concurrently:
(i) continuously maintains a dead zone of polymerizable liquid in contact with said build surface, and
(ii) continuously maintains a gradient of polymerization zone between said dead zone and said solid polymer and in contact with each thereof, said gradient of polymerization zone comprising said polymerizable liquid in partially cured form.

18. The apparatus of claim 17, wherein said gas/pressure controller is configured to intermittently apply a reduced pressure to the polymerizable liquid through the optically transparent member to thereby reduce a nitrogen content of the polymerizable liquid that is sufficient to maintain a dead zone of less than 1000 microns by reducing a nitrogen gas concentration in the polymerizable liquid.

19. The apparatus of claim 18, wherein said carrier with said polymerized region adhered thereto is configured to unidirectionally advance away from the build surface on a stationary build plate.

20. The apparatus of claim 19, wherein said controller is configured to fill said build region by vertically reciprocating said carrier with respect to said build surface to enhance or speed the refilling of said build region with said polymerizable liquid.

21. The apparatus of claim 1, wherein said controller is configured to reduce or hold stationary advancement of the carrier when a reduced pressure is applied to the polymerizable liquid through the optically transparent member.

22. An apparatus for forming a three-dimensional object from a polymerizable liquid, comprising:
(a) a support;
(b) a carrier operatively associated with said support on which carrier said three-dimensional object is formed;
(c) a gas permeable optically transparent member having a build surface, with said build surface and said carrier defining a build region therebetween;
(d) a liquid polymer supply operatively associated with said build surface and configured to supply liquid polymer into said build region for solidification or polymerization;
(e) a radiation source configured to irradiate said build region through said optically transparent member to form a solid polymer from said polymerizable liquid;
(f) optionally at least one drive operatively associated with either said transparent member or said carrier;
(g) a controller operatively associated with said carrier, and/or optionally said at least one drive, and said radiation source for continuously or intermittently advancing said carrier away from said build surface to form said three-dimensional object from said solid polymer,
(h) a gas/pressure controller in fluid communication with said optically transparent member configured to control a pressure and/or supply a gas to said build surface through said gas permeable member, wherein said gas/pressure controller is configured to
apply a reduced pressure and oxygen enriched gas to the polymerizable liquid through the optically transparent member to thereby reduce a nitrogen content of the polymerizable liquid by supplying oxygen through the optically transparent member into the polymerizable liquid while withdrawing nitrogen from the polymerizable liquid through the optically transparent member; and
wherein the polymerizable liquid comprises a lower region on the optically transparent member, and an upper region on the lower region opposite the optically transparent member,
wherein said gas/pressure controller is configured to apply a reduced pressure oxygen enriched gas to the polymerizable liquid through the optically transparent member and reduce a gas concentration in the upper region.

23. The apparatus of claim 22, wherein a thickness of the lower region is about 1 to 1000 microns.

24. The apparatus of claim 22, wherein the gas/pressure controller is configured to apply a reduced pressure to the polymerization liquid through the optically transparent member that is sufficient to reduce a gas concentration in the upper region and maintain a gas concentration in the lower region.

* * * * *